US007009596B2

(12) United States Patent
Seet et al.

(10) Patent No.: US 7,009,596 B2
(45) **Date of Patent: *Mar. 7, 2006**

(54) PROGRAMMABLE VIRTUAL BOOK SYSTEM

(75) Inventors: Chern Hway Seet, Singapore (SG); Seng Beng Ho, Singapore (SG)

(73) Assignee: E-Book Systems PTE LTD, Singapore (SG)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 10/760,298

(22) Filed: Jan. 21, 2004

(65) Prior Publication Data

US 2004/0201569 A1 Oct. 14, 2004

Related U.S. Application Data

(60) Provisional application No. 60/441,135, filed on Jan. 21, 2003.

(51) Int. Cl.
*G09G 5/00* (2006.01)

(52) U.S. Cl. ...................................... 345/156; 345/901

(58) Field of Classification Search ................ 345/156, 345/901, 173
See application file for complete search history.

(56) References Cited

U.S. PATENT DOCUMENTS

| | | | | |
|---|---|---|---|---|
| 5,417,575 | A | 5/1995 | McTaggart | |
| 5,467,102 | A | 11/1995 | Kuno et al. | |
| 5,909,207 | A | 6/1999 | Ho | |
| 6,064,384 | A * | 5/2000 | Ho | 345/839 |
| 6,229,502 | B1 | 5/2001 | Schwab | |
| 6,320,591 | B1 * | 11/2001 | Griencewic | 345/582 |
| 6,486,895 | B1 | 11/2002 | Robertson et al. | |
| 6,747,680 | B1 * | 6/2004 | Igarashi et al. | 345/784 |
| 2004/0039750 | A1 * | 2/2004 | Anderson et al. | 707/103 R |

OTHER PUBLICATIONS

Open eBook Forum (EeB); Publication Structure 1.2; Recommended Specification Aug. 27, 2002; pp. 1-93.

* cited by examiner

*Primary Examiner*—Ricardo Osorio
(74) *Attorney, Agent, or Firm*—Oblon, Spivak, McClelland, Maier & Neustadt, P.C.

(57) ABSTRACT

An electronic information browsing system that provides a book-like interface—a virtual book—for presenting electronic contents. Specifically, an electronic information browsing system that allows users to configure its behavior via data and program specification encapsulated in a dynamic file format. Configurable behavior includes but not limited to the kind of contents to be displayed in the virtual book, the sources of the contents to be displayed, the static aspects of the virtual book such as the book dimensions and the dynamic aspects of the virtual book such as when a page is to be flipped, how the flipping of pages is contingent upon the execution of certain pre-specified events, etc.

23 Claims, 15 Drawing Sheets

DATA PERSISTENCE

E-MAIL PASTING

SEARCH BOOK CREATION

PROGRAMMABLE VIRTUAL BOOK SYSTEM

CROSS REFERENCE TO RELATED PATENT DOCUMENT

This application is related to the following patent applications all of which are incorporated herein by reference: Application Ser. No. 60/365,186 filed on Mar. 19, 2002; Application Ser. No. 60/367,765 filed on Mar. 28, 2002; Application Ser. No. 60/410,278 filed on Sep. 13, 2002; U.S. application Ser. No. 10/142,996 filed on May 13, 2002; U.S. application Ser. No. 10/142,858 filed on May 13, 2002; U.S. application Ser. No. 10/143,005 filed on May 13, 2002; U.S. application Ser. No. 09/686,965 filed on Oct. 12, 2000; U.S. application Ser. No. 10/283,084 filed on Oct. 30, 2002; U.S. application Ser. No. 09/686,902 filed on Oct. 12, 2000; U.S. application Ser. No. 09/617,043 filed on Jul. 14, 2000; U.S. application Ser. No. 10/052,387 filed on Jan. 23, 2002; and U.S. application Ser. No. 10/029,868 filed on Dec. 13, 2001. This application is also related to the following patents, all of which are incorporated by reference: U.S. Pat. No. 5,909,207 issued Jun. 1, 1999; U.S. Pat. No. 6,064,384 issued May 16, 2000; U.S. Pat. No. 6,340,980 issued Jan. 22, 2002; and U.S. Pat. No. 6,407,757 issued Jun. 18, 2002.

BACKGROUND OF THE INVENTION

1. Field of the Invention

The present invention relates to a software system that provides for the rapid access and viewing of electronic contents on the Internet as well as on standalone devices. Specifically, the present invention provides for a virtual book-like interface for the ease of navigation through electronic contents. This facilitates the browsing of the electronic contents in such a way that it allows a rapid view of what contents are present and the organization of the contents, as well as rapid access to the items in the contents involved. The virtual book system is programmable through an application programming interface. The setting of the mode of display of the virtual book interface, the control of the changes to the virtual book display, the interaction of the contents in the virtual book interface with program and data from outside the virtual book system, and other desired static and dynamic effects to be applied to the interface and other parts of the virtual book system can all be flexibly effected by the programmable system.

2. Description of the Prior Art

Currently, the method for viewing documents stored in a computer is through a computer monitor screen. For documents that are longer/larger than can be contained within one screen, a means is provided to scroll the document up and down or to jump to a particular point in the document (through the use of, for example, a "mouse" coupled with scroll bars at the edges of the document displayed on the screen or through the use of hypertext links).

However, most people do not find this a particularly convenient way to view a document, as compared with a book. That this is true is evidenced in the fact that despite the fact that the computer has been in increasing use, there is not only no corresponding reduction in paper use, but an increase in paper quantity is required to print what is conveniently stored in a computer that can be seemingly easily and flexibly manipulated for viewing. Sometimes the printed version of the information involved is necessary, like in the case of printing a picture on a sheet of paper to be pasted on some surface (e.g., a wall), or in the case of the convenience of having a relatively light, hardy paperback book for reading in almost any possible situation and location, but there are times when a reader is quite happy to sit at a desk in front of a desktop computer or handle a notebook computer away from the desk, and yet the reader would still prefer a printed version of the document in a hand-held format. This is especially true in the case of looking through manuals, including software manuals, to understand how to operate a device or software application. The irony is that computer software packages usually come with thick and heavy manuals containing information which can easily be stored on a light-weight CD-ROM, and even if the manuals are sometimes dispensed in the form of a CD-ROM, more often than not people would print them out into a hard-copy format in order to facilitate reading.

What is involved when one interacts with the printed material in a book is a subtle and complicated process. To start with, material in a book is presented in a sequential order, with a continuity of material from page to page, and there is also a hierarchical structure in the material presented (as the material is organized into chapters, sections, subsections, etc.) because ideas in the material are related to each other in some kind of conceptual hierarchy. The human perceptual system inputs data in a sequential manner. Thus, after a book is read from the beginning to the end in a sequential fashion, the brain then recreates the conceptual hierarchy after viewing the material involved. However, very often one does not read a book (or input the material involved) from the beginning to the end because (a) one wants to have an overview of the material present; (b) one is searching for something of interest to him/her; or (c) one is interested in reading only portions of the book (in the case of, say, reading the manual to understand how to operate something). In these cases, one browses through the subject book to find the material of unique interest to that reader.

Two basic things are achieved in the browsing process. First, the browser has a glimpse of what are the contents of the book document. Second, the browser has an idea of approximately where the items of interest are so that the browser can (a) return to look for them later when needed, and (b) have an understanding of the relationships between the material currently being viewed and other material (i.e., an understanding of the hierarchical structure involved). When browsing a book document, many finger-operations are required of the browser in order to flip through the pages and, together with the inherent sequential order imposed by the pages, very quickly allow the browser to have an understanding of the nature, location and organization of the material involved.

In the process of browsing through a book, one can perform the following operations:

(a) Flip through the pages at varying speeds depending on the level of detail at which one wishes to view the material in the book;

(b) Jump to the approximate location of the item of interest;

(c) Change the direction of flipping (forward or backward) very rapidly because (i) One would like to compare and contrast material on different pages, (ii) After jumping to an approximate location of some items of interest one would like to find their exact locations, or (iii) One is unsure of where the item of interest is and is in the process of searching for it; and (d) Mark the locations of some pages of interest that one may want to later return.

All these operations are performed very rapidly with the fingers interacting with the flipping pages and with minimal unnecessary movements of the fingers and hands. Interestingly, a book/magazine with soft and flexible pages is harder to handle because more finger and hand movements are needed to browse through it, while books with stiff pages can be browsed with almost no movement of the hand.

In currently available methods of browsing through documents stored in a computer, e.g., the use of a mouse combined with scroll bars and buttons on the computer screen, more movements of the hands are necessary to effect the various operations described above. Also, fine control of the hand or fingers (depending on whether the mouse uses hand movement to move the cursor on the screen or finger movement like in the case of a track ball) is necessary to position the cursor on the screen at the required places. The process is both lengthy and clumsy. The lengthiness of the process taxes the human short term memory s ability to remember items encountered in the recent past for the purpose of establishing the relationships between items and the clumsiness of the process creates distraction and interferes with the short term memory process, a well known effect in perceptual psychology.

Because material in a book is organized into pages, it also enhances the ability of the reader to better remember the location of various portions of the material involved. Also, unlike the process of scrolling through a document on a screen like what is normally done in a word-processor, wherein the contents become a blur and reading is impossible, when one moves through the material in a book through flipping, one is still able to read at least the approximate contents, if not the details. It is due to these features that a person browsing through a book can acquire a good understanding of its contents, the location of specific items and organization of the material.

It is because of the reasons set forth above, people still prefer to read a book in their hands, rather than a document image displayed on a computer screen using currently available methods.

U.S. Pat. No. 5,467,102 (Kuno et al.) discloses a device for document viewing that consists of two display screens. One of the purposes of using two display screens is to allow the user to display two different pages from the document so that they can be read side-by-side (e.g., a diagram and its textual explanation). Another purpose is to allow a large picture to be displayed simultaneously on both pages. The Kuno et al. device allows users to change the speed of movement through the document through a pressure sensor—the more pressure applied, the faster the pages in the document are moved through. The Kuno et al. device also allows the document to be viewed in the forward or backward direction by pressing on a forward sensor area or a reverse sensor area respectively. One can also select a page to jump to by pressing on an icon displayed on the screen. However the Kuno et al. device still does not provide the same convenience as browsing through a book, primarily because when switching between the operations for different controls—the speed of movement through the document, the change of direction of viewing, and the jumping to different parts of the document—there are a lot more hand and finger movements than is the case in manipulating a physical book.

In U.S. Pat. No. 5,417,575 (1995) McTaggart discloses an electronic book that comprises laminated sheets bound together in the form of a book. On each of these sheets, printed material is arranged on the top layer and below that layer is an electronic backdrop containing thin light-emitting diodes (LED's) and pressure sensitive switches affixed onto a backing sheet. The LED's generate visual signals that can be seen through the top layer for the purpose of highlighting parts of the printed material. The pressure switches, positioned under certain items in the printed material, are for the purpose of sensing the user's selection of those items. A speaker is also provided on the book to generate audio signals for explaining the text or giving the user audio feedback. Contact or photo-sensitive switches are also embedded in the pages to allow the electronic circuits to know which pages are currently being viewed, so that the appropriate audio and visual signals can be generated. Even though this apparatus is in a form that allows a person to handle it like handling a typical book, with visual and audio enhancements of the printed material as well as facilities that accept the user's feedback, it is basically a hard-wired device that is not reprogrammable and different hardware has to be configured for books with different contents. No provision is available for downloading document files from a computer for display on the electronic book nor is the electronic book able to display any arbitrary document file. This device is hence not suitable for browsing through documents stored in a computer.

U.S. Pat. No. 5,909,207 (Ho) discloses a computer-based system that allows users to view and manipulate documents in the form of an electronic virtual book that addresses the above problems in browsing information in the electronic medium. This virtual book system simulates the paper book very closely and has two major components. One is the representation of the paper book on the computer screen, complete with realistic flipping pages and thickness representation. The other is the use of a browsing device that allows 1) rapid change of direction of flipping; 2) rapid change of speed of flipping; 3) selection and jumping to any desired page; and 4) bookmarking of the pages. The browsing device allows one to use the fingers to manipulate the pages in the book much in the same way as in the case of the paper book. Therefore, the virtual manipulation of the pages together with the book image on the screen constitutes a virtual book system. This virtual book system improves on the methods used in current electronic means of information browsing in a very significant way such that the ease of browsing information can approach that obtainable with a paper book. This allows users to be able to quickly browse through a large number of pages (perhaps thousands of pages) of information and obtain the idea of the structure and contents involved and hence a good overview of the entire collection of material in the "virtual book". Other than being able to have a good idea of the structure and contents of the material involved, the process of browsing through the material presented in the form of a virtual book much like in the case of the paper book also facilitates subsequent searches for items in the material.

In U.S. Pat. No. 5,909,207 (Ho), the virtual book system depends on a software module that provides for the generation of the virtual book interface and the display of the contents on the pages of the virtual book. The virtual book system reads data from the hard disk or other sources (such as the Internet) and sets certain basic parameters for the virtual book display (such as the dimensions of the virtual book). However, the virtual book system does not provide a programmable interface that allows an external program to interact with, control, and instruct the basic virtual book display software module to achieve more complex static and dynamic effects in the virtual book system. To achieve more complex behavior or to modify the existing behavior of the virtual book system, the basic virtual book display software module has to be reprogrammed. This requires additional effort, cost, and time.

Therefore, the inventor has identified there exists a need for a programmable virtual book system for the rapid reconfiguration of the desired behavior of the entire virtual book system, including its ability to interact with and receive commands and data from external programs and applications.

SUMMARY OF THE INVENTION

In view of the aforementioned short-comings of presently available schemes for providing for a virtual book system for the display and browsing of electronic contents, one objective of the present invention is to provide a programmable virtual book system for the purpose of rapid configuration of the desired behavior of the virtual book system.

Another objective of the present invention is to provide a virtual book behavior specification method, system, and computer program product that includes the specification of the static as well as dynamic aspects of the behavior of the virtual book system.

A further objective of the present invention is to provide the specification for the structure of the book behavior specification method, system, and computer program product in a form of a data and program file containing the static and dynamic sections.

Still a further objective of the invention is to provide a specification of how the dynamic specification part of the book behavior specification interacts with external programs and data.

Another objective of the present invention is to provide a specification of how the dynamic specification part of the book behavior specification interacts with the basic virtual book software through an application program interface.

Yet another objective of the present invention is to provide a specification of how the dynamic specification part of the book behavior specification generates control signals to control certain aspects of the virtual book interface.

Another objective of the present invention is to provide the algorithm for the programmable virtual book system.

A further objective of the present invention is to provide a method, system, and computer program product for certain event to trigger certain desired action in the virtual book system.

Yet another objective of the present invention is to provide a method, system, and computer program product for activating a flipping to a desired page in the virtual book displayed in the virtual book system on the completion of certain event such as the completion of the playing of a video or audio file on one of the pages in the virtual book or elsewhere on the display screen.

Another objective of the present invention is to provide a general algorithm for the execution of certain action as a result of the execution of certain event in the virtual book system.

A further objective of the present invention is to provide a method, system, and computer program product for enlarging the virtual book displayed on the display screen.

Yet another objective of the present invention is to provide a method, system, and computer program product for making some collected data persistent when the virtual book is flipped from one page to another, that is, the data entered into the system while viewing a certain page is still available in later pages so that all the data involved can be collected and integrated.

Another objective of the present invention is to provide a method, system, and computer program product for extracting information in a program or application outside the virtual book system and display it in the virtual book within the virtual book system.

A further objective of the present invention is to provide a method, system, and computer program product to extract e-mail information from a program or application outside the virtual book system and display it in the virtual book within the virtual book system.

Yet another objective of the present invention is to provide a method, system, and computer program product to display the search results generated from a program or application outside the virtual book system in the virtual book within the virtual book system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
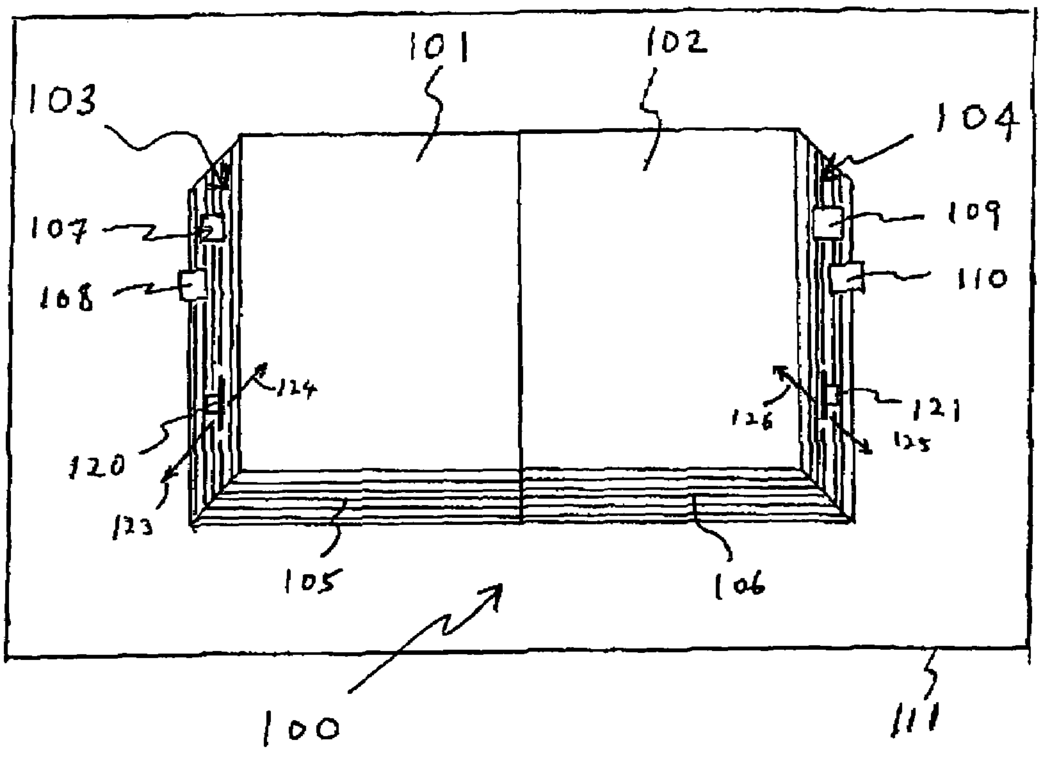
FIG. 1A is the top perspective view of an embodiment of a virtual book display showing the various components such as the thickness, the bookmarks, and the jump cursors.

Referring now to the drawings, wherein like reference numerals designate identical or corresponding parts throughout the several views, and more particularly to FIG. 1A thereof which depicts the virtual book interface 100 according to the present invention that can be used in conjunction with existing computer or other electronic system for the purpose of browsing through documents or any information stored in the computer or other electronic system.

The virtual book interface 100 displayed on a display screen 111 consists of two sides, a left side 101 and a right side 102. There is a left side thickness 103 and a right side thickness 104 associated with the left side 101 and the right side 102 respectively. There is also a bottom left thickness 105 and a bottom right thickness 106. Any number of bookmarks (e.g., 107 and 108) can be positioned on the left thickness 103 (or 105) and any number of right bookmarks (e.g. 109 and 110) can be positioned on the right thickness 104 (or 106).

Jump cursors 120 and 121 on the left thickness 103 and the right thickness 104 respectively can be used to select the desired page to jump to. The jump cursors 120 and 121 can move "up and down" on the thickness 103 and 104 in a direction perpendicular to the vertical edge of the page 101 and 102. (Directions 123 and 124 for the left jump cursor 120 and directions 125 and 126 for the right jump cursor 121.) The "up and down" movement on the thickness allows the jump cursor to select the desired page in the document (virtual book 100) to jump to.

Figure 1B:
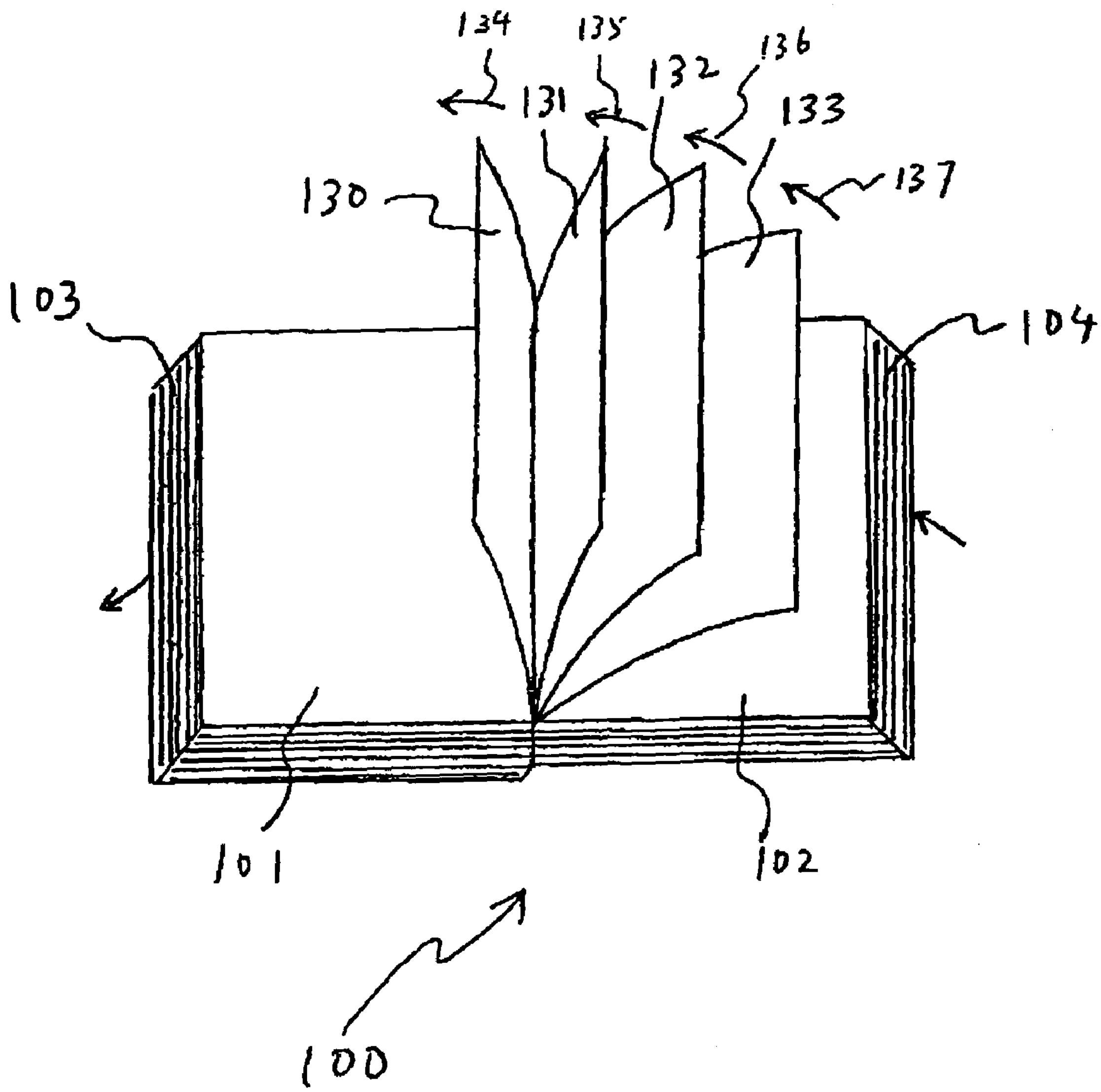
FIG. 1B is a top perspective view of an embodiment of a virtual book showing the flipping of the pages and the changing of the thicknesses.

FIG. 1B depicts the situation in which pages in the virtual book are flipped to reveal other parts of the documents not earlier seen. One or more than one page (e.g., 130–133) can be flipped simultaneously. The arrows 134–137 show the directions of the flipping pages 130–133 respectively. In this case, the pages 130–133 are going from the right side of the book 102 to the left side 101. As the pages are moved from one side of the book, say, the right side of the book, to the other side, say the left side, of the book, the thickness 103 and 104 on both sides of the book change accordingly. In this case, if pages go from right to left, then the right thickness 104 decreases in width and the left thickness 103, after the pages 130–133 have landed on the left side 101, will increase in width. Vice versa for pages flipping from the left side 101 to the right side 102.

Figure 1C:
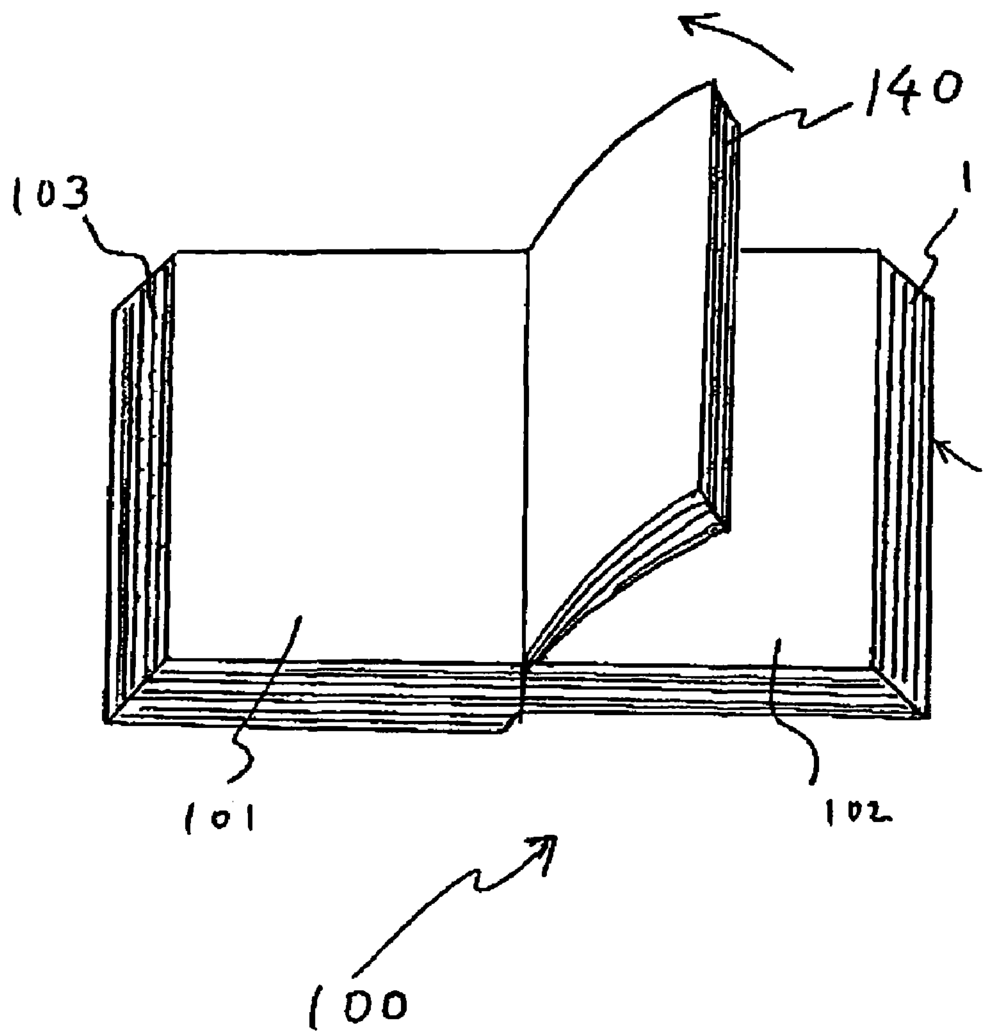
FIG. 1C is a top perspective view of an embodiment of a virtual book showing the flipping across of a thickness proportional to the number of pages skipped over.

When a desired page to jump to is being selected (by using, say, either the jump cursors 120 and 121 or bookmarks 107–110) and the jump activated, the pages will flip to the destination page, and at the same time, a thickness 140 representing the amount of material/number of pages in between the currently viewed page and the page(s) to jump to is shown to flip across the book accordingly as depicted in FIG. 1C. In FIG. 1C, the desired page to jump to is on the right side 102 of the book and the flipping thickness 140 is shown to flip from the right side of the book 102 to the left side 101, and the thickness on the right side 104 is shown to decrease as the flipping thickness 140 leaves the right side 102 to move over to the left side 101. When the flipping thickness 140 lands on the left side, the left thickness 103 will increase in width. Vice versa for flipping thickness going from the left side 101 to the right side 102.

Figure 1D:
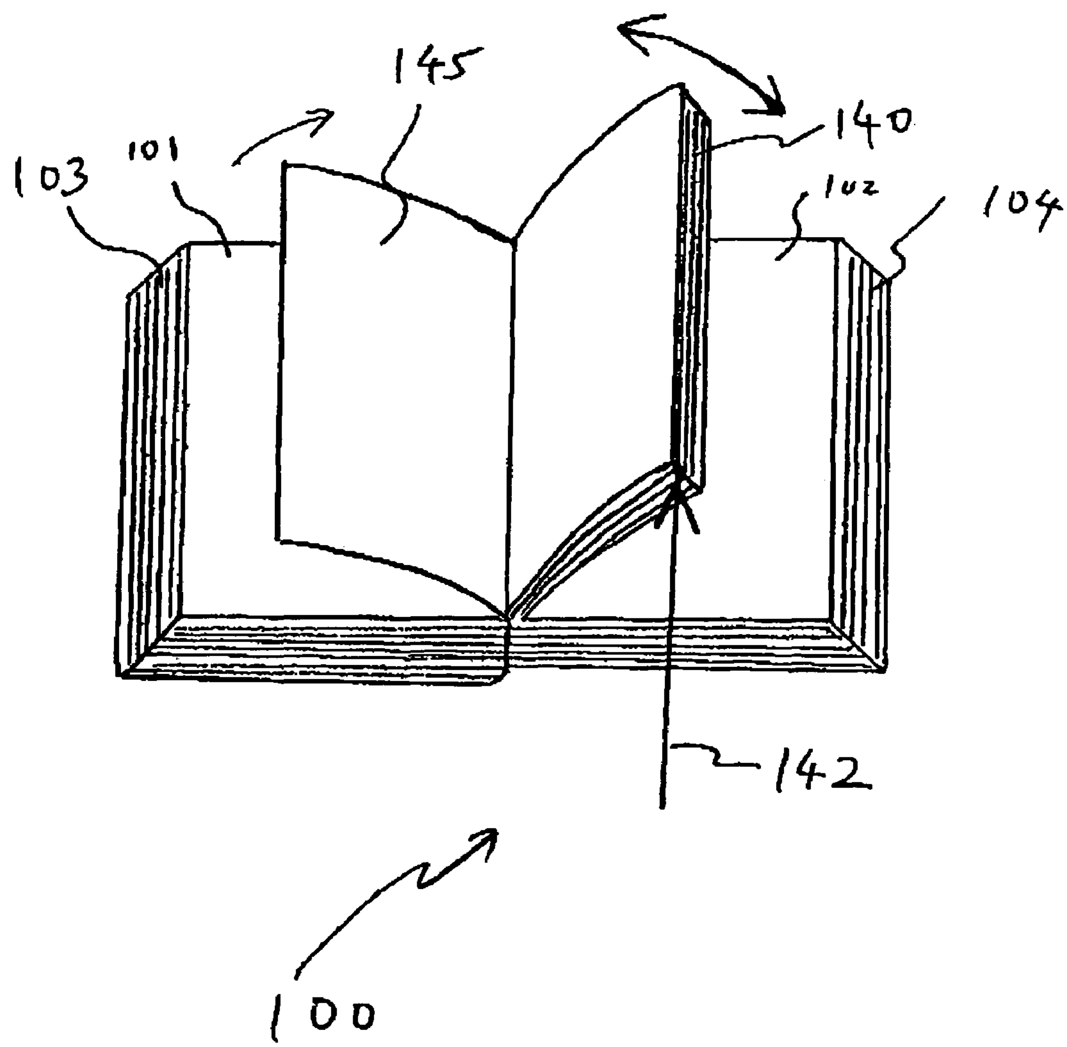
FIG. 1D is a top perspective view of an embodiment of a virtual book showing the holding and flipping about of a collection of pages and a single page being flipped toward the collection of pages.

FIG. 1D depicts the situation in which a collection of pages 140 is being held by some kind of pointer 142 and being flipped about, instead of being allowed to flip freely and land on the left side 101 or right side 102 of the book 100. This allows the contents on the various visible pages to be compared and contrasted. FIG. 1D also depicts a single page 145 being flipped from the left side 101 of the book 100 toward the collection of pages 140. One or more pages from the left side 101 or the right side 102 of the book 100 can be added to the collection 140 or one or more pages from the collection 140 can be removed from the collection 140 to return to the left side 101 or right side 102 of the book 100. This is to facilitate the viewing and comparison of pages in the book 100.

Figure 1E:
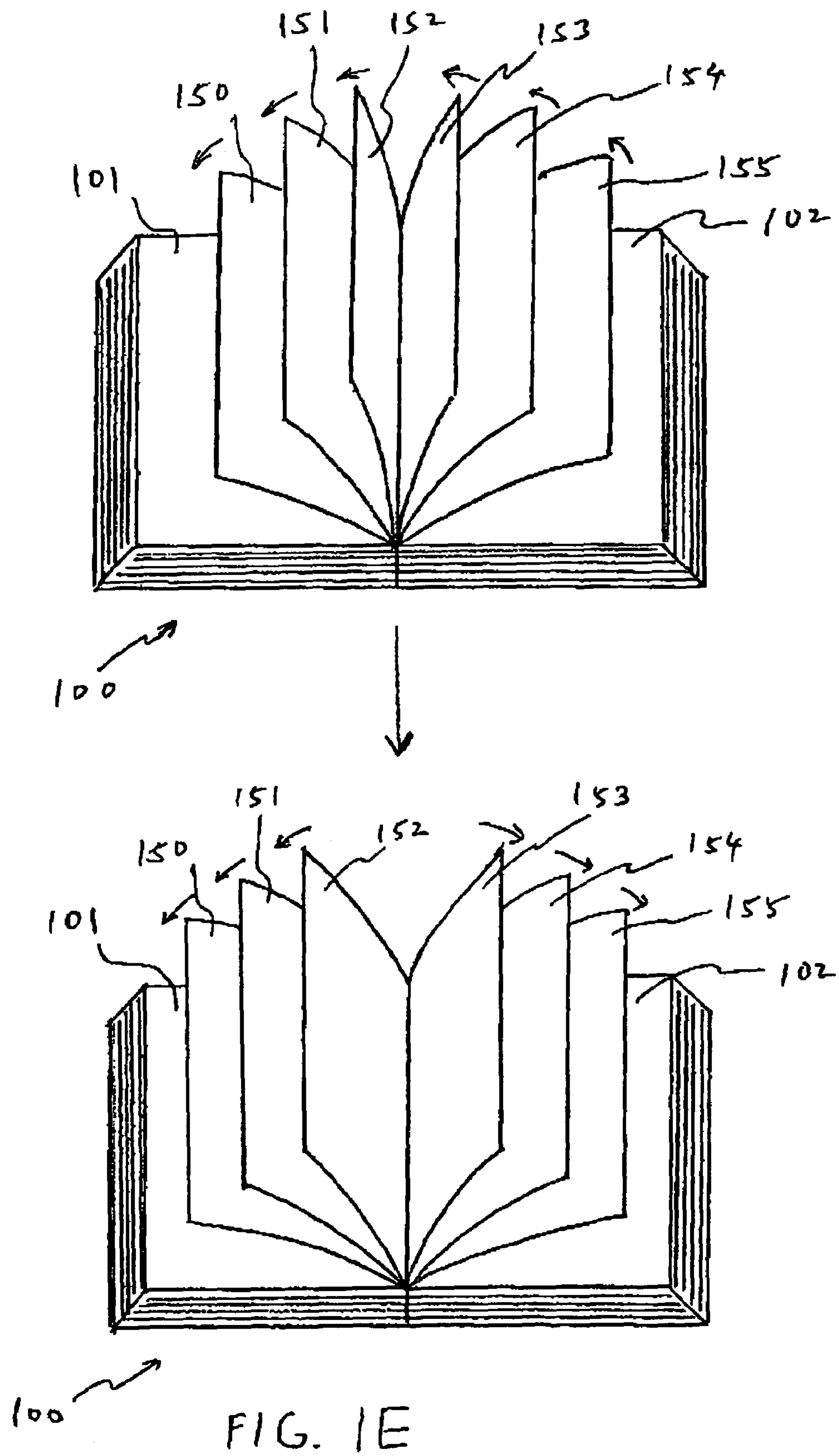
FIG. 1E is a top perspective view of an embodiment of a virtual book showing multiple pages being flipped simultaneously across the screen firstly in one direction followed by some of the pages changing the direction of flipping.

FIG. 1E depicts other methods of manipulating the pages in the book 100. Some of the pages 150–155 initially flipping from the right side 102 to the left side 101 of the book 100 are made to change direction and flip in the opposite directions. Pages 153–155 are made to change direction to flip back toward the right side 102 of the book 100. This can happen when the reader/browser decides, in the middle of flipping the pages 150–155, that there are interesting things to be viewed, say, in between pages 152 and 153 and wishes to have the pages "opened" at this point to facilitate viewing/reading. Continued movement of the pages 150–152 toward the left side 101 of the book 100 and movement of the pages 153–155 toward the right side 102 of the book 100 will result in the contents between pages 152 and 153 being laid flat for the reader/browser to view/read.

Figure 2:
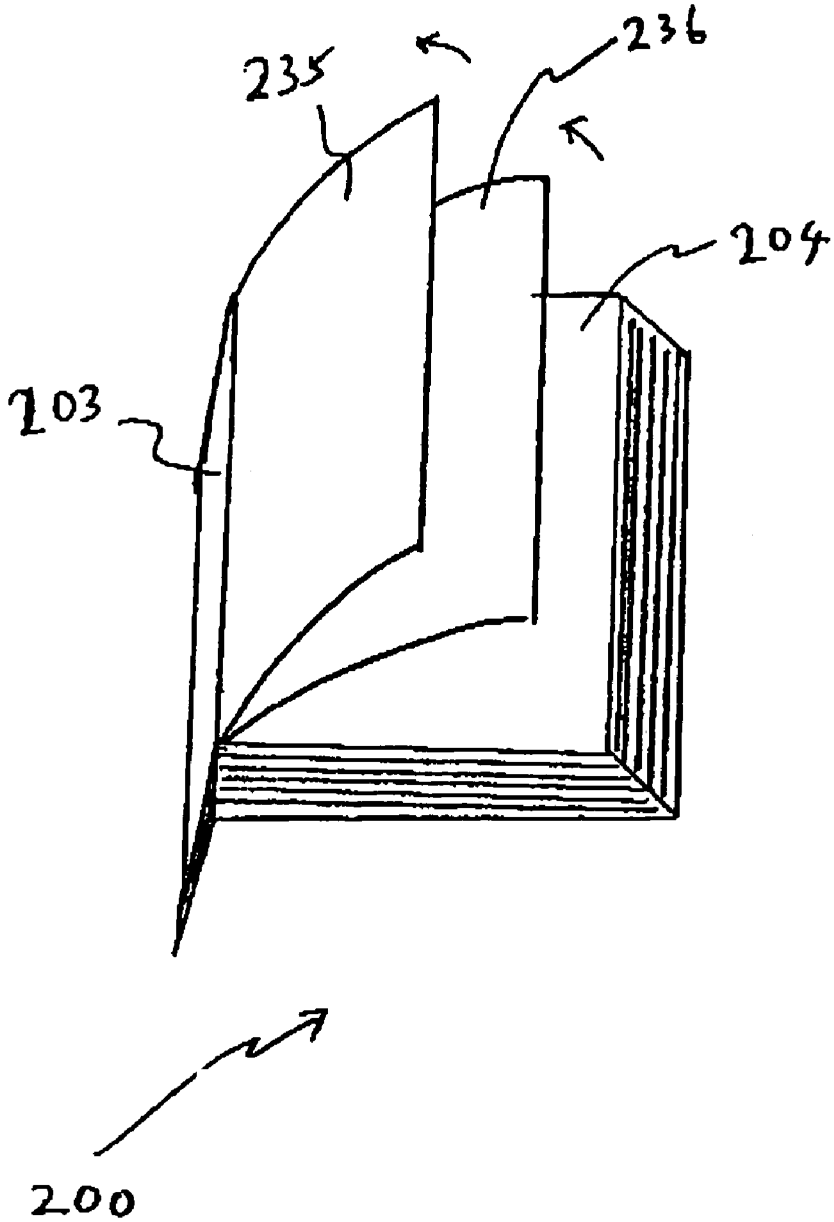
FIG. 2 is a top perspective view of an embodiment of a one-sided virtual book display.

FIG. 2 depicts another embodiment 200 of the virtual book 100. The left side 203 of the virtual book 200 is bent back to an extent that it almost disappears. This is to facilitate a kind of "one-sided" book display in which only one side (in this case the right side 204) is visible. This is useful when there is limited real estate on the display screen and only one side of the book can be displayed. The pages 235 and 236 are shown to be flipped across the book 200 from the right side 204 to the left side 203. In other embodiments, the left side 203 of the virtual book 200 can be made invisible so that it does not occupy any space on the display screen.

Figure 3:
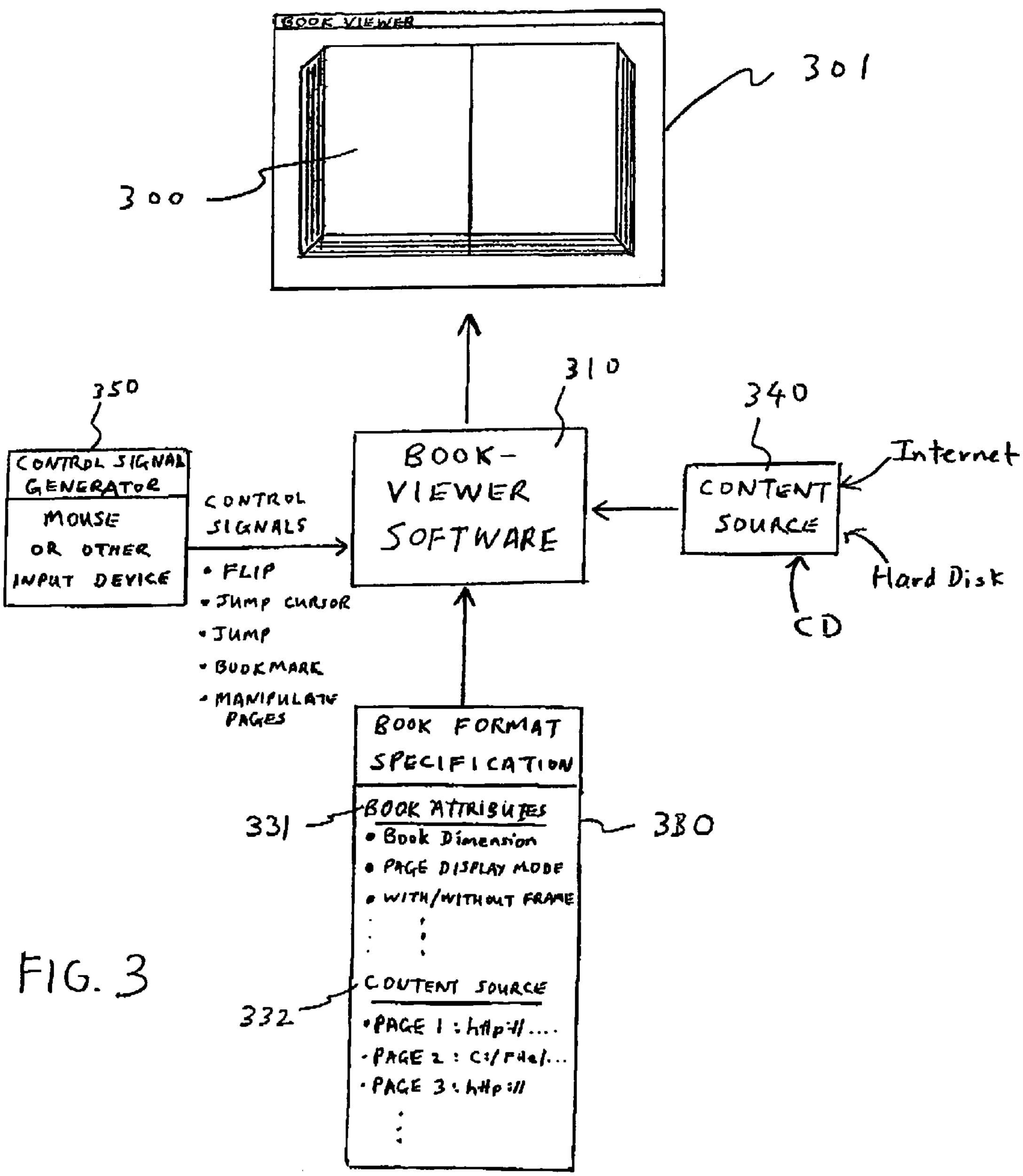
FIG. 3 illustrates an embodiment of a software system that provides for the generation of a virtual book on a display screen.

FIG. 3 depicts a software system that provides for the generation of the virtual book 300 within a display frame, say, 301 on a display screen. The center of the software system is a Book-Viewer Software 310 that generates the virtual book 300 interface and takes in contents from some sources and displays them on the virtual book 300. The Contents Source 340 can derive contents from the Internet, the hard disk of a computer, the CD inserted into a computer, other memory sources or other sources. There is a Book Format Specification 330, which is a data file resident either on the Internet, the hard disk of a computer, a CD, other memory sources or other sources. The Book Format Specification 330 contains two or more sections. One of the sections could be a Book Attributes Section 331 which contains specification on the virtual books' 300 dimensions, the mode of display of the pages (e.g., whether contents are to be split and displayed in a two-page—a right and left page—mode or are to be displayed in a single "center spread" mode where they would straddle both the left and right pages), whether the book would have a window frame (such as the frame 301) surrounding it or is to be displayed on its own, etc. Another section could be a Content Source Section 332 which contains the specification on the sources of the contents, e.g., where the contents of Pages 1, 2, 3, etc. are coming from (i.e., from what location on the Internet, the hard disk, etc.)

The Book Format Specification 330 basically instructs the Book-Viewer Software 310 how to create a virtual book 300 on a display screen complete with its contents. After the virtual book 300 has been displayed on a display screen, it can be manipulated—i.e., the pages can be flipped, the contents can be searched, etc. The Control Signal Generator 350 can be a mouse or other input devices. This can generate commands to manipulate the virtual book 300 such as flipping commands that generate the flipping actions depicted in FIGS. 1B and 1E, jump cursor control commands depicted in FIG. 1A, jump commands depicted in FIG. 1C, bookmarking commands depicted in FIG. 1A, complex page manipulation commands depicted in FIGS. 1D and 1E, etc.

The Book Format Specification 330 depicted in FIG. 3 is relatively static. Its contents are static data that are read by the Book-Viewer Software 310 and used to create a relatively static virtual book 300. Some of the contents on the virtual book 300 thus created can be dynamic, such as when some video data are being displayed, but most of the basic properties of the book (such as its dimensions, etc.) are not changed by the data in the Book Format Specification 330 since the data is static. (Some of the basic properties of the virtual book 300 can still be changed by the Book-Viewing Software 310 in conjunction with commands from the Control Signal Generator 350, such as using the mouse to drag on the corners of the frame 301 to change the dimensions of the frame 301 hence the dimensions of the virtual book 300, but this signal does not come from the Book Format Specification 330.)

Figure 4:
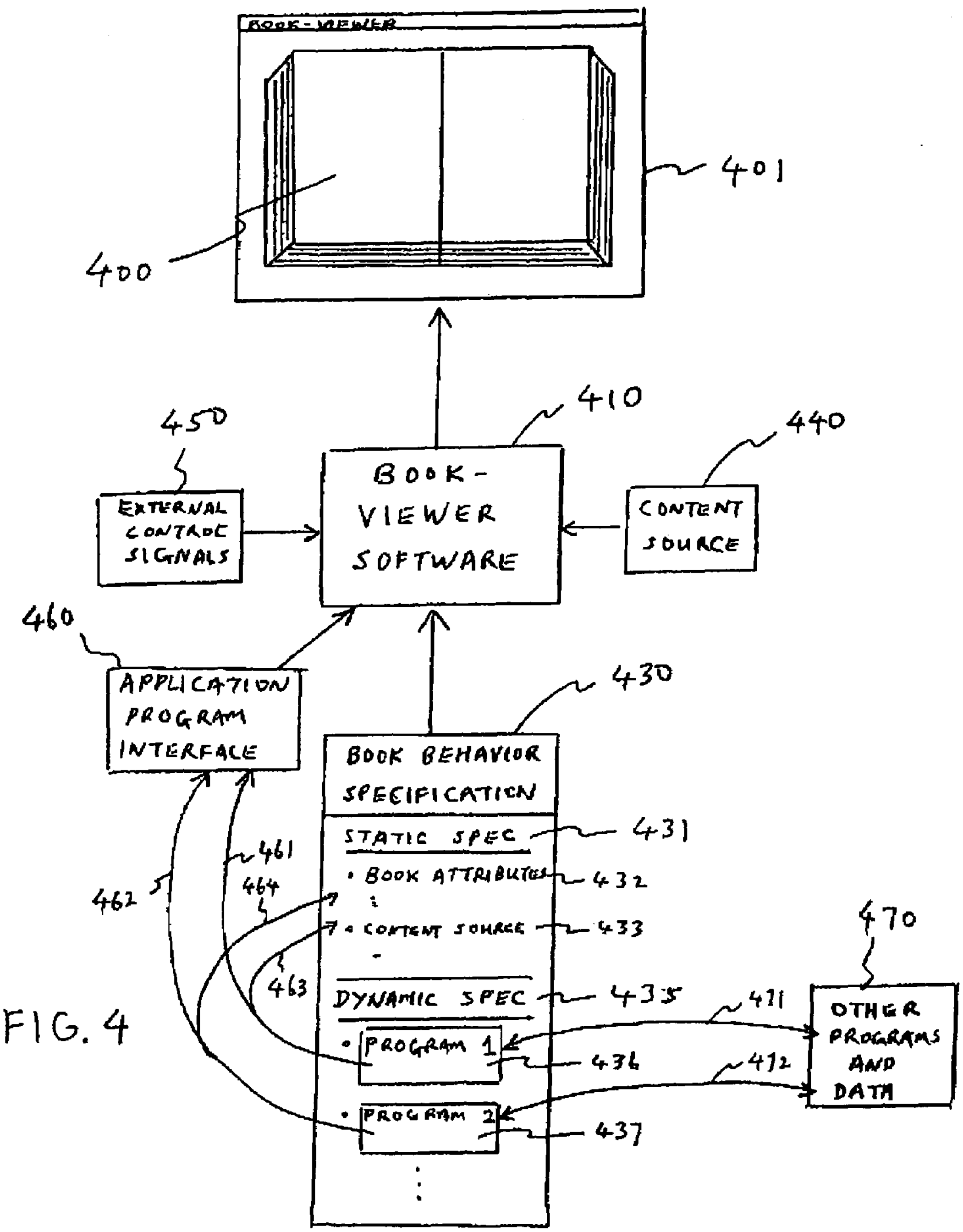
FIG. 4 illustrates an embodiment of a programmable software system that provides for the generation of a virtual book on a display screen.

FIG. 4 depicts a system that allows more flexible control of a virtual book 400 displayed on a display screen. The Book Behavior Specification 430 that directs the Book-Viewer Software 410 to create the virtual book 400 contains a Static Specification Section 431 and a Dynamic Specification Section 435. The Static Specification Section 431 contains Book Attributes Specifications 432, Content Source Specification 433 and other specifications. The Dynamic Specification Section 435 contains one or more programs, such as Program 1 436, Program 2 437, etc. that specify the dynamic and run-time behavior of the virtual book 400. The Book Behavior Specification 430 thus contains data and programs.

The Programs 436, 437, etc. when interpreted and executed, may instruct certain dynamic behavior to be effected on the virtual book 400 through an Application Program Interface 460 that sends instructions to the Book-Viewer Software 410. This is affected through pathways 461, 462, etc.

To allow even more flexible control of the virtual book 400, the Programs 436, 437, etc. can also modify the Static Specification Section 431 within the Book Behavior Specification 430. This is shown in pathways 463, 464, etc. If one of the Book Attributes 432 is the dimensions of the virtual book 400, say, then one or more of the Programs 436, 437, etc. can effect the change of the dimensions of the virtual book 400 during run-time (i.e., during the process of creating and browsing the virtual book 400) by changing the value of the dimensions in the Book Attributes 432 through pathways 463, 464, etc. Modifications of the Programs 436, 437, etc. by the Programs 436, 437, etc. themselves are also possible through the pathways 463, 464, etc.

Another source of control and data sent through the Programs 436, 437, etc. in the Dynamic Specification Section 435 of the Book Behavior Specification 430 can be Other Programs and Data 470 outside the virtual book system. This is depicted in the pathways 471, 472, etc. in FIG. 4. This is one way data embedded in other programs and applications can be brought into the virtual book 400 and the behavior of the virtual book 400 can be contingent on the behavior of other programs and data outside the basic Book-Viewer Software 410 system.

With the Application Program Interface 460, the control signals for manipulating the virtual book 400, instead of originating in some external devices such as a mouse or other input devices (i.e., the External Control Signals 450) can now originate in the Programs 436, 437, etc. and effected through the Application Program Interface 460.

The Dynamic and Static Specifications, 431 and 435, of the Book Behavior Specification 430 need not be encapsulated together as shown in FIG. 4. They can be separate entities linked to the Book-Viewer Software 410.

One embodiment of the Programs 436, 437, etc. in the Dynamic Specification Section 435 of the Book Behavior Specification 430 can be Java Scripts. One method to interpret the Java Scripts 436, 437, etc. can be using Microsoft's Internet Explorer®. Four examples of Java Scripts per the present invention are attached as Appendix A.

Figure 5:
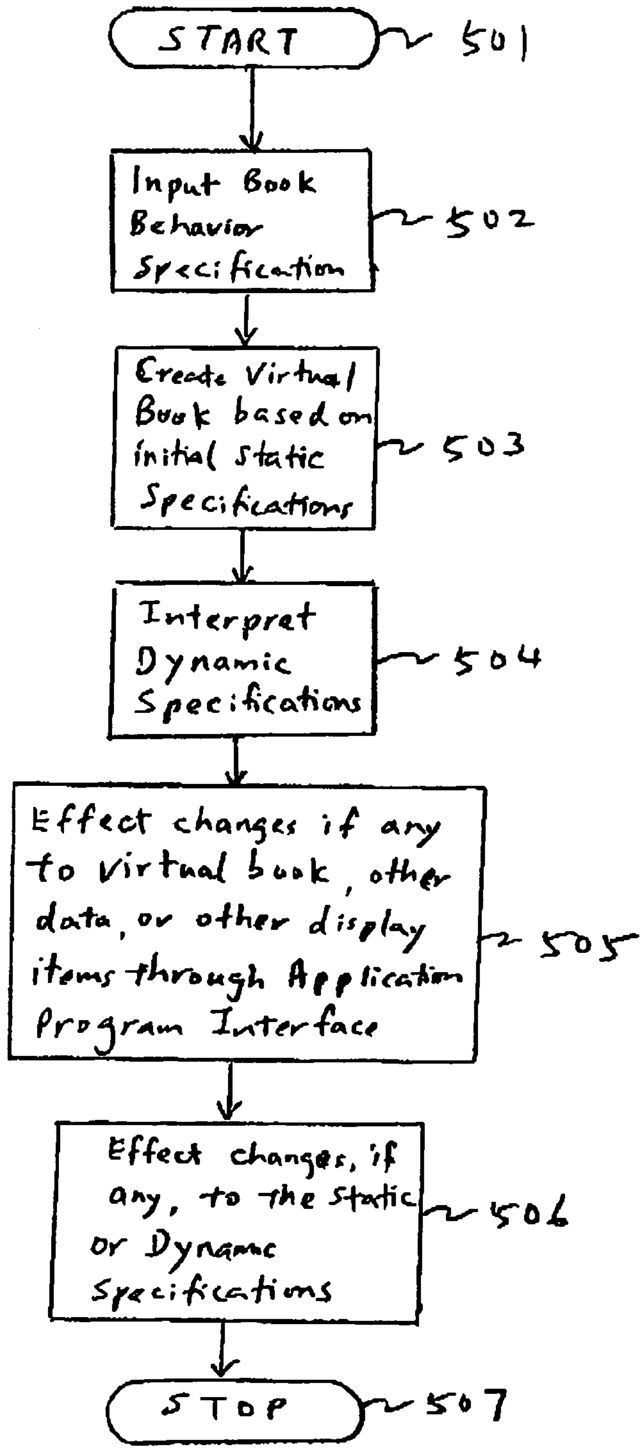
FIG. 5 illustrates the flowchart of one embodiment of the process used by a programmable software system that provides for the generation of a virtual book on a display screen.

FIG. 5 shows one embodiment of the process by which the Book-Viewer Software 410 creates and manipulates a virtual book 400. The process begins in step 501. The process then flows to step 502 in which the Book Behavior Specification 430 is read and interpreted. The process then flows to step 503 in which the virtual book 400 is created based on the initial Static Specifications 431. After this, the process flows to step 504 in which the Programs 436, 437, etc. in the Dynamic Specifications Section 435 are interpreted. The process then flows to step 505 in which changes, if any, as directed by the Programs 436, 437, etc., by other External Control Signals 450, or by other sources are effected through the Application Program Interface 460 on the virtual book 400, on other data resident on the computer system, on other displayed items on the display screen, on other devices, memory or otherwise, on other entities connected by wire or by other means to the computer system, or on other kinds of entities. After this, the process flows to step 506 in which changes, if any, as specified by the Programs 436, 437, etc., by other External Control Signals 450, or by other sources are effected on the Static Specifications 431 or Dynamic Specifications 435 in the Book Behavior Specification 430. The process the flows to step 507 in which it terminates.

Figure 6:
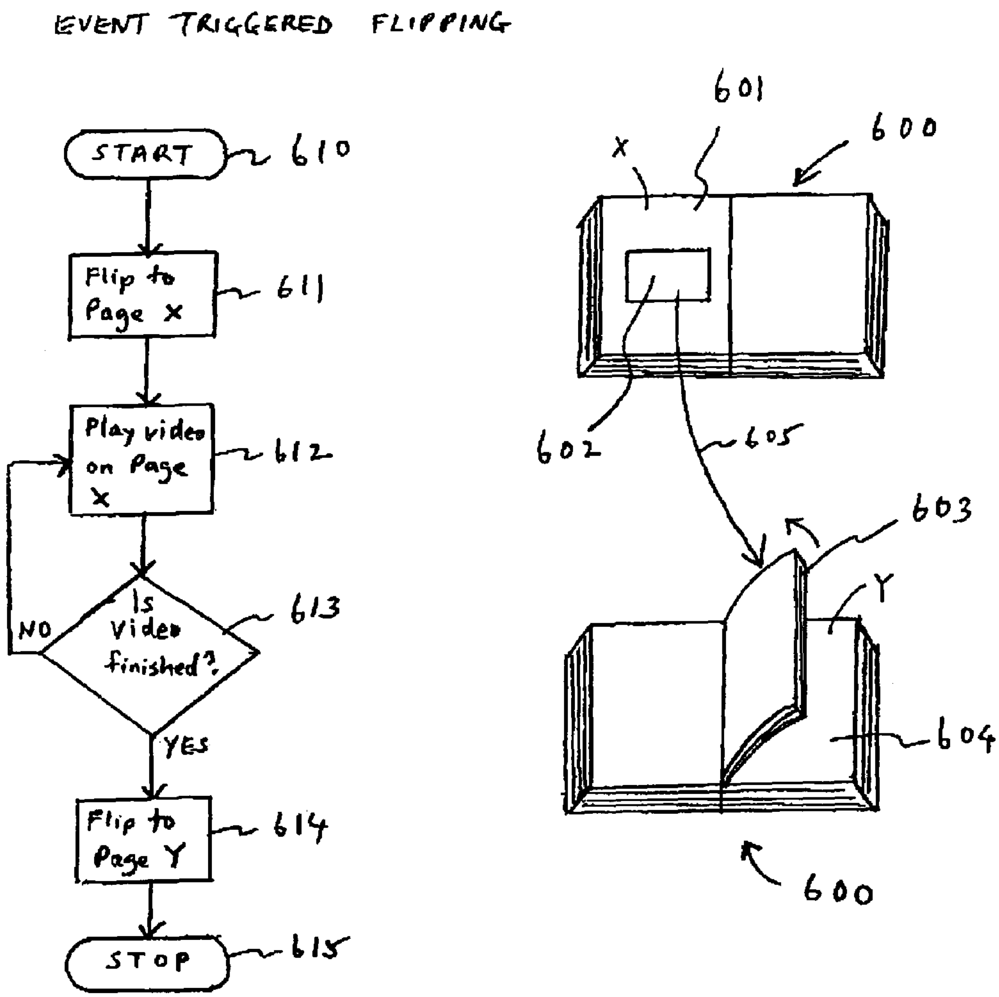
FIG. 6 illustrates the flowchart of one embodiment of the process for the flipping of the pages of a virtual book to a desired location based in the completion of a video event in a programmable virtual book system.

FIG. 6 depicts an application of the flexible, programmable virtual book system depicted in FIG. 4. A Program (one of 436, 437, etc.) in the Dynamic Specification Section 435 of the Book Behavior Specification 430 implements the process as shown in FIG. 6. The process starts in step 610. The process then flows to step 611, in which a Page X is flipped to. This is illustrated in the virtual book 600 in which the page 601 ("Page X") is being displayed. The process then flows to step 612, in which a video file is played on the page X. This corresponds to a video file 602 being played on page 601 in the virtual book 600. After this, the process flows to step 613 in which the state of the video playing is checked. This checking can be effected by a Program (436 or 437) embedded in the Dynamic Specification Section 435 of the Book Behavior Specification 430 (FIG. 4). The Program 436 can read from an external video player program, say, (this video player corresponds to the Other Program and Data block 470), that plays the video file 602 on page 601 of the virtual book 600 the state of the video playing. If the video is not finished, the process flows back to step 612, in which the video continues to be played. If the video is finished, the process flows to step 614 in which the action of flipping to Page Y is effected. This flipping action can be effected by a Program 436 embedded in the Dynamic Specification Section 435 of the Book Behavior Specification 430 (FIG. 4). This Program 436 can send a command to effect the flipping through the Application Program Interface 460 which in turn sends a command to the Book-Viewer Software 410 to effect the flipping. This is illustrated in the pathway 605 in which the ending of the video 602 triggers a flipping of the pages to page 604 ("Page Y") in the virtual book 600. A thickness 603 is shown indicating that more than one page may have been skipped over in this process. After this, the process ends at step 615. The process as depicted in FIG. 6 is an "event triggered flipping" process.

The concatenation of many repeated segments of the process depicted in FIG. 6 can have many applications such as one in which a story is told, and as it unfolds, the pages are flipped to the respective places in the virtual book in which different video, audio, textual or other information continues the story. This delivers an auto-flipping and auto-narrated story.

Figure 7:
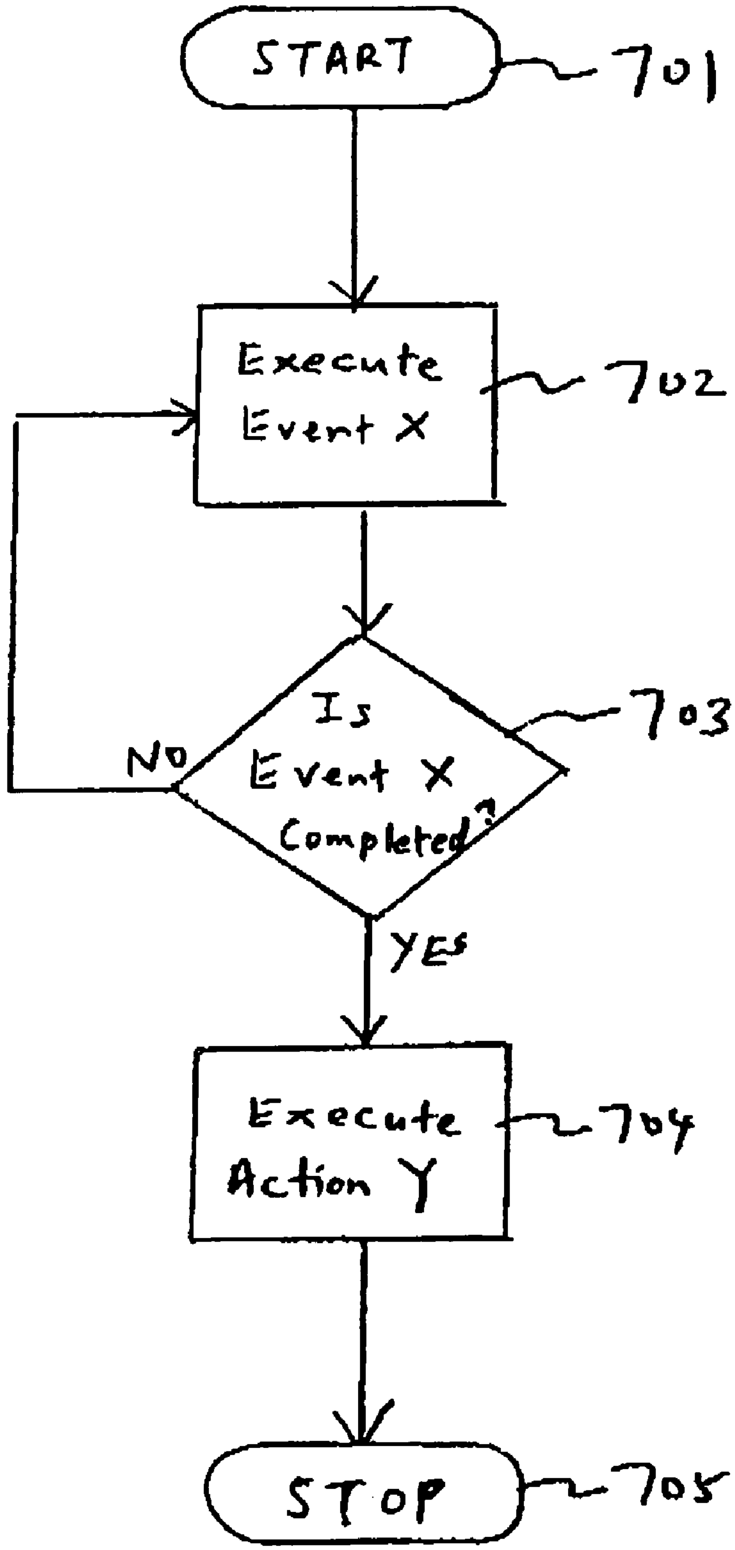
FIG. 7 illustrates the flowchart of one embodiment of the process for the triggering of an action on the completion of a certain event in a programmable virtual book system.

FIG. 7 depicts an embodiment of the general process used for the programmable virtual book system depicted in FIG. 4. The process starts at step 701. The process then flows to step 702 in which an Event X is executed. The Event X could be video content, audio content, textual content or other kinds of contents displayed on a page of a virtual book, other events created by the Book-Viewer Software such as the flipping of a page, or an event created by another program outside the current Book-Viewer Software 410, such as Other Programs and Data 470 depicted in FIG. 4. The process then flows to step 703 in which the status of the Event X is checked to see if it is completed. If it is not, the process returns to step 702 and the Event X continues. If Event X is completed, then the process flows to step 704 in which an Action Y is executed. Action Y can be further events executed on the virtual book 400 (such as the flipping of a page or the removal of some pages), actions carried out by the Book-Viewer Software 410 on entities outside the virtual book 400, or actions executed by other software/applications outside the Book-Viewer software 410, such as Other Program and Data 470 depicted in FIG. 4.

Figure 8:
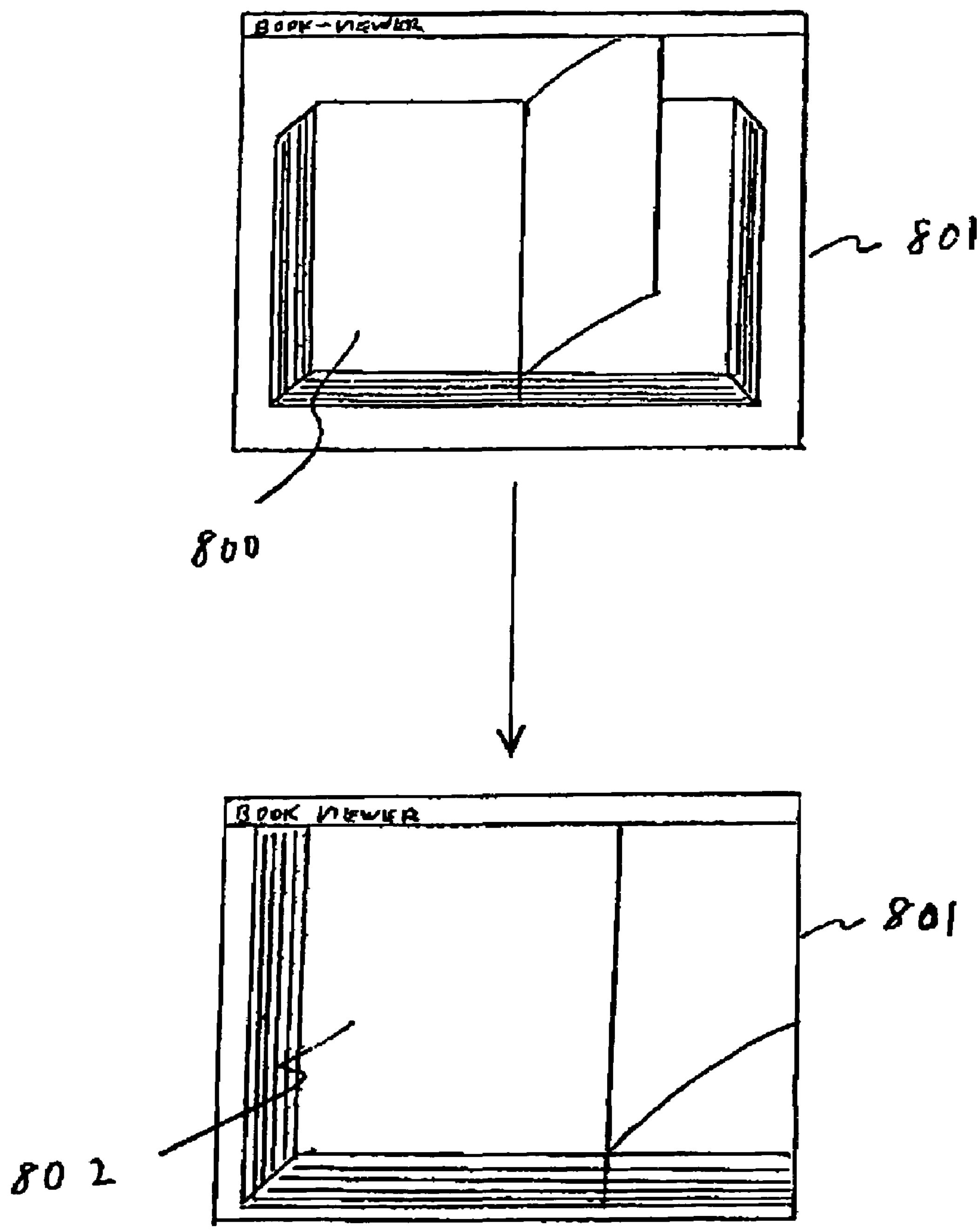
FIG. 8 is a top perspective view of an embodiment of the virtual book display showing the enlargement of the virtual book.

FIG. 8 depicts the use of the programmable virtual book system depicted in FIG. 4 to create a "zoom-in" effect for the virtual book 800. The original virtual book 800, contained in the window 801, is enlarged and becomes the enlarged virtual book 802. The pages on the enlarged virtual book 802 have full capabilities of being manipulated just like in the case of the original virtual book 800. I.e., while viewing the enlarged contents, the readers/browsers can still flip the pages, use the jump cursors, flip multiple pages, manipulate the pages back-and-forward, etc., like those actions depicted in FIGS. 1A–1E.

To implement the zooming function as described above, one way is to hard-wire in the functionality into the Book-Viewer Software 410. However, a better approach is to build in a set of standard basic functions in the Book-Viewer Software 410 (which may not include a zooming function) and then write programs such as Programs 436, 437 embedded in the Dynamic Specification Section 435 of the Book Behavior Specification 430 (or write other external programs) to call these basic functions through the Application Program Interface 460 in some manners and combinations to achieve certain complex functions such as zooming. This is because each time new and specific functions are desired of the virtual book system depicted in FIG. 4 (say, a certain behavior is desired of the virtual book 400 in response to various situations), and each time these functions are hard-coded/hard-wired into the Book-Viewer Software 410, it entails an entire cycle of coding, debugging, and quality control process, which means substantial amount of time and costs are involved. On the other hand, if a certain number of basic functions are first encoded into the Book-Viewer Software 410, and the Book-Viewer Software 410 can thus be re-programmed by the Programs (436, 437, etc.) or other external programs, a lot of time, effort, and costs can be saved.

Figure 9:
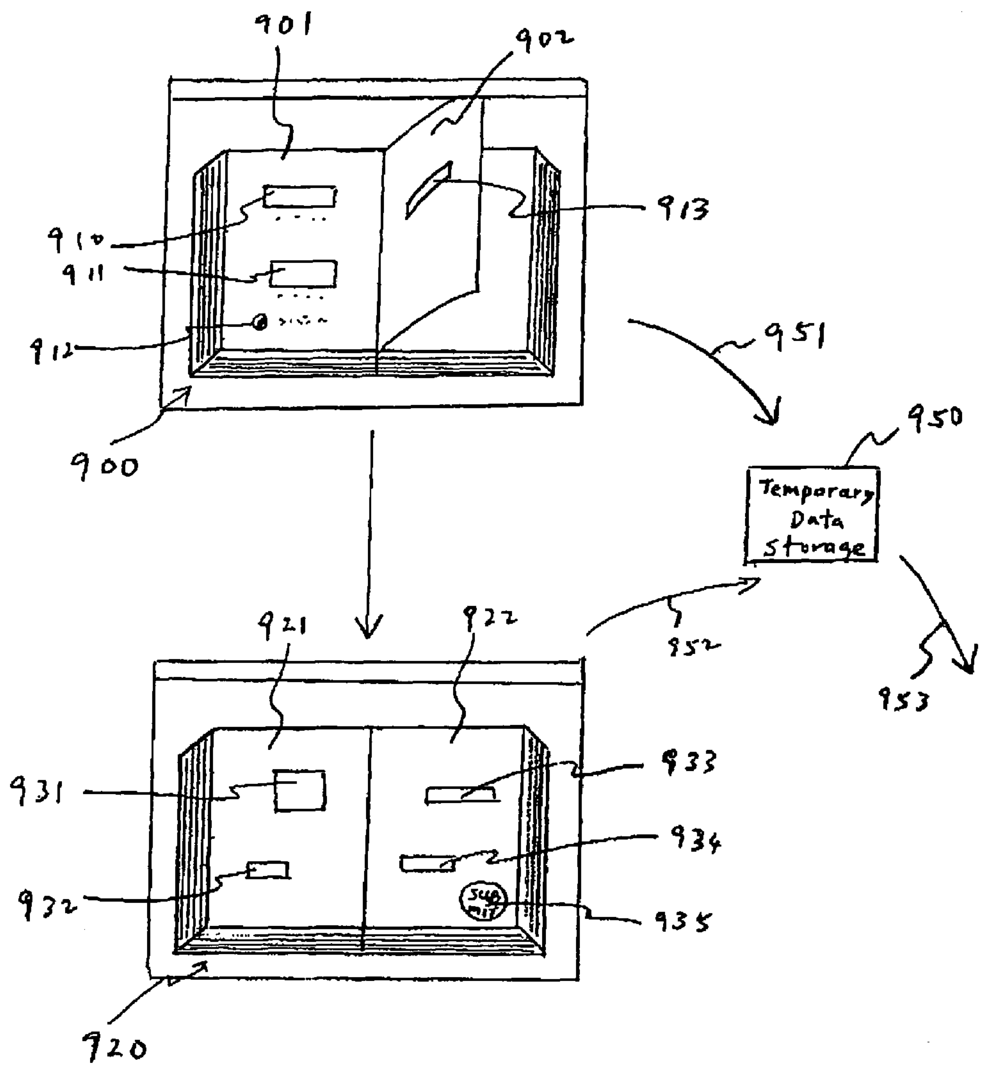
FIG. 9 is a top perspective view of an embodiment of a virtual book display showing the method for making data persistent across the flipping and display of many pages.

FIG. 9 depicts the use of the programmable virtual book system depicted in FIG. 4 to implement a persistence effect for the data entered on the pages of a virtual book 900 so that the data can be retained from page to page. In the virtual book 900 depicted in FIG. 9, there are pages 901, 902, etc. that have text boxes and radio buttons 910, 911, 912, 913, etc. that can allow readers/browsers to enter their data. These data can be yes/no answers to some questions, information in text form provided and entered into the text boxes by the reader/browser, etc. One method to collect such data would be to use Microsoft Internet Explorer® components that can be activated to process the data on each of the pages. Each page thus can be an HTML file that can be passed to Microsoft Internet Explorer® components. However, because each page is an instantiation of one instance of Microsoft Internet Explorer® components, the data collected on each page is not persistent—i.e., they disappear when the focus is shifted to other pages. Thus, if a survey form, say, of some kind is spread over many pages of a virtual book 900, then the data cannot be collected all at once and stored and transmitted together.

To implement data persistence in a situation depicted in FIG. 9, a Temporary Data Storage 950 can be created by the programmable virtual book system depicted in FIG. 4. A Program (one of 436, 437, etc.) in the Book Behavior Specification 430 can extract data on each page as they become available and then store them in the temporary data storage 950 (data pathways 951, 952, etc.). This "Temporary Data Storage" module 950 corresponds to the Other Program and Data module 470 in FIG. 4. The bottom half of FIG. 9 depicts another state of the virtual book 920 in which pages 921 and 922 are being displayed and there are more text boxes 931, 932, 933, 934, etc. that can be used to collect more data to store in the temporary storage 950 (data pathway 952). On page 922, there is a SUBMIT button 935 which, when clicked, will transfer the data in the temporary data storage 950 to some pre-determined location for further processing (data pathway 953). Therefore, using this method, data over many pages can be made persistent and all the desired data can be collected and submitted all at once when desired.

Figure 10:
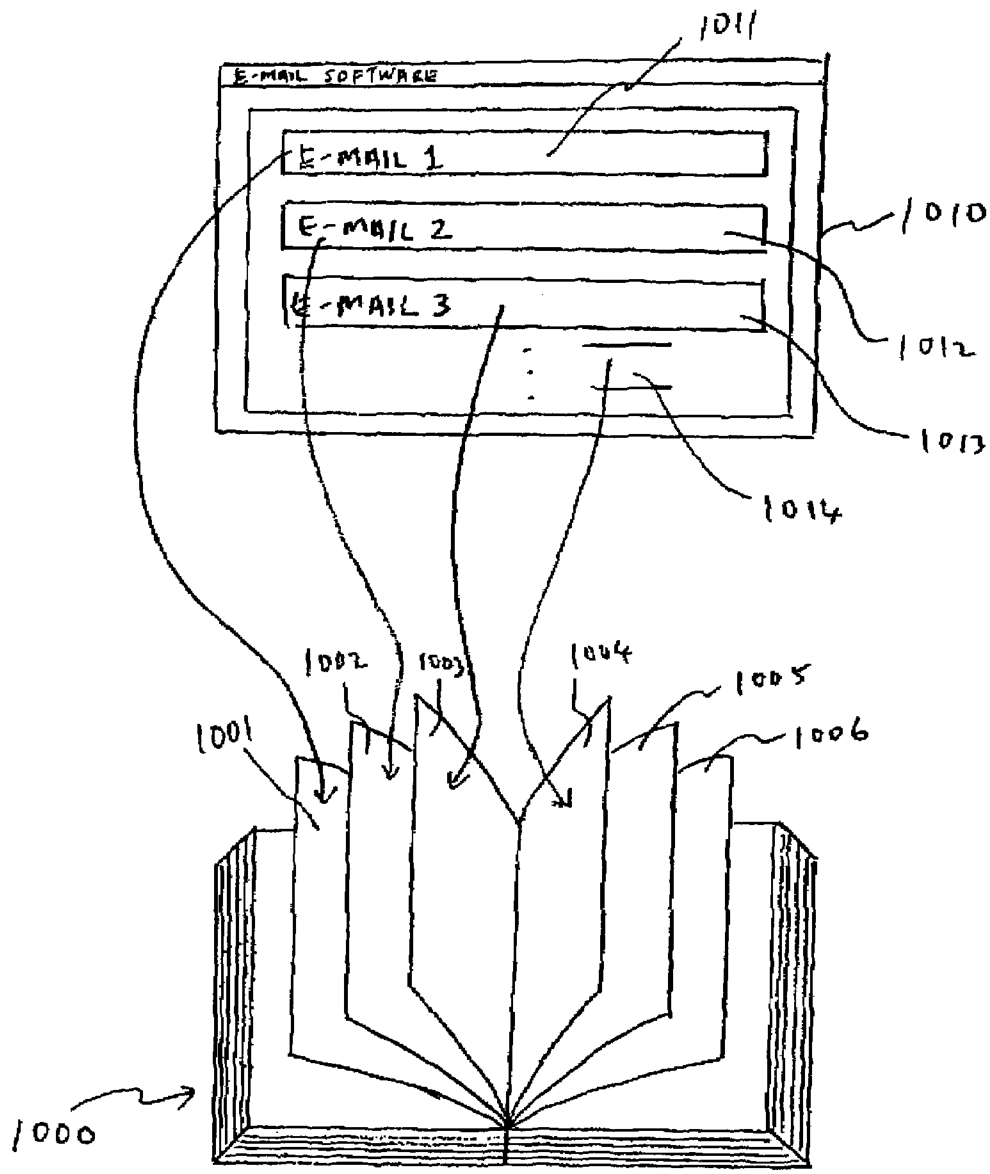
FIG. 10 is a top perspective view of an embodiment of a virtual book display showing the method for the transfer of information from an external e-mail software onto the pages of the virtual book.

FIG. 10 depicts another use of the programmable virtual book system depicted in FIG. 4 in which a transfer of data can be affected from an e-mail software 1010 (such as Microsoft Outlook®) onto the pages of a virtual book 1000. Many software, e-mail software included, have "hooks" available for other software to interact with their processes and data. A Program (one of 436, 437, etc.) resident in the Book Behavior Specification 430 of the virtual book 1000 can call these hooks in the e-mail software 1010 and transfer the corresponding e-mail messages 1011, 1012, 1013, 1014, etc. onto the pages 1001, 1002, 1003, 1004, etc. respectively.

To achieve this, the Program (436, 437) reads in the e-mail contents 1011, 1012, 1013, 1014, etc. by communicating with the e-mail software 1010 (which is the Other Programs and Data block 470 in FIG. 4.) through the available "hooks" and then transfers the data through the Application Program Interface 460 into the Book-Viewing Software 410 and instructs the Book-Viewing Software through the Application Program Interface 460 to place the e-mail messages 1011, 1012, 1013, 1014, etc. on the pages 1001, 1002, 1003, 1004, etc. accordingly. By doing this, the data in the original software 1010 can be better browsed and searched in the more user-friendly virtual book interface 1000.

Figure 11:
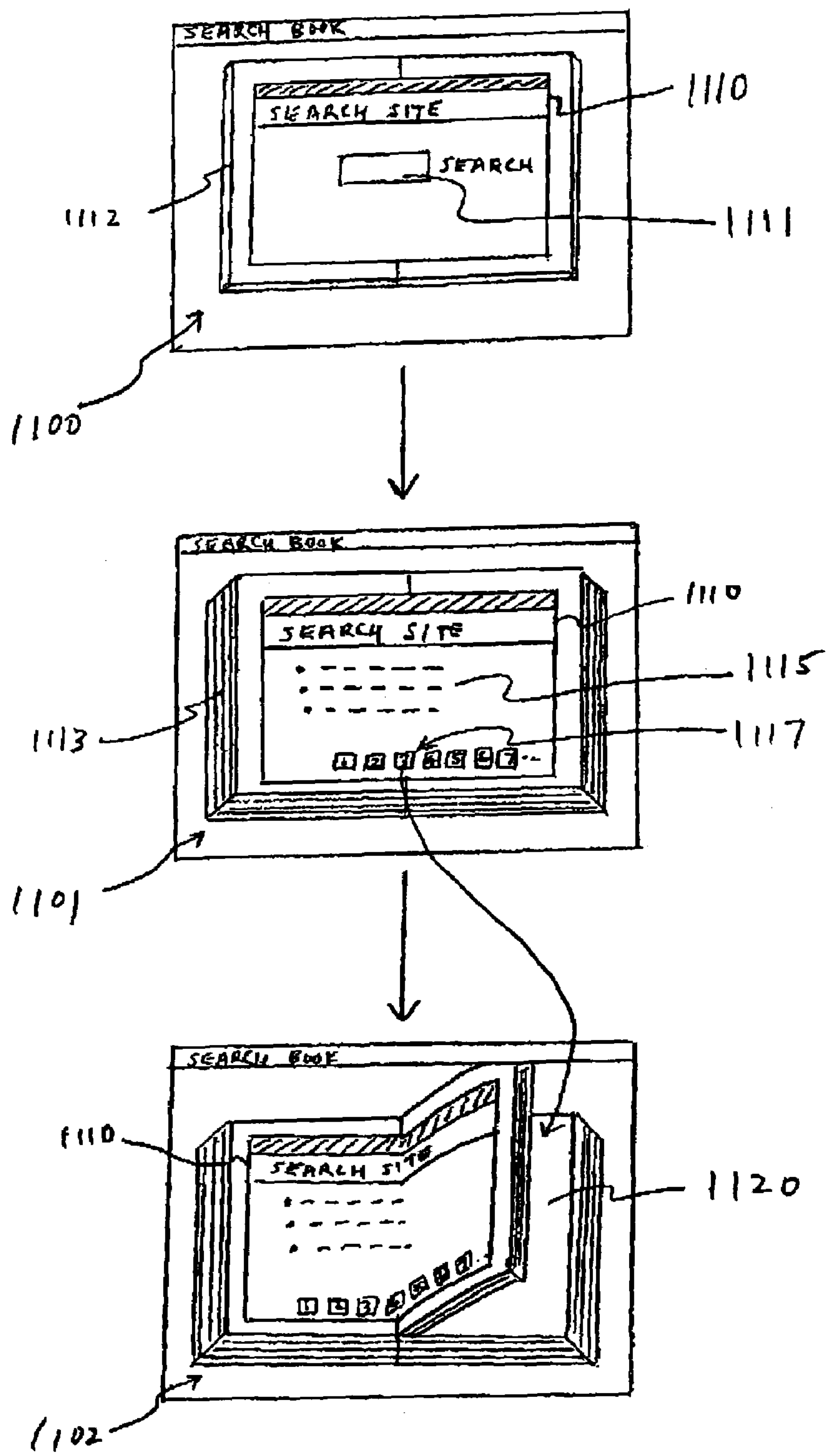
FIG. 11 is a top perspective view of an embodiment of a virtual book display showing the method for the display of the results of search from an external search engine software onto the pages of the virtual book.
Figure 1A:
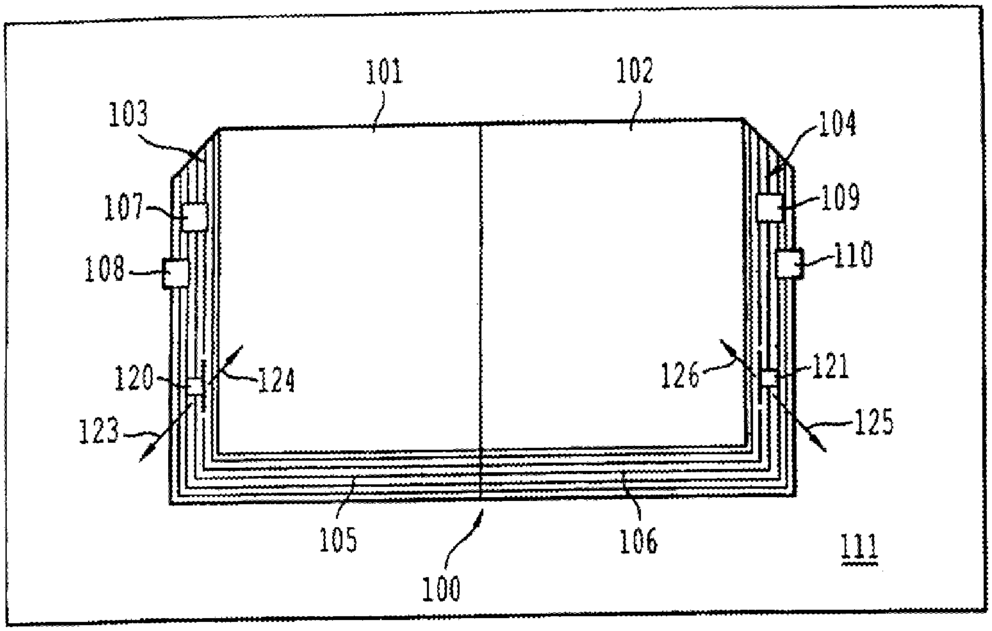
Figure 1B:
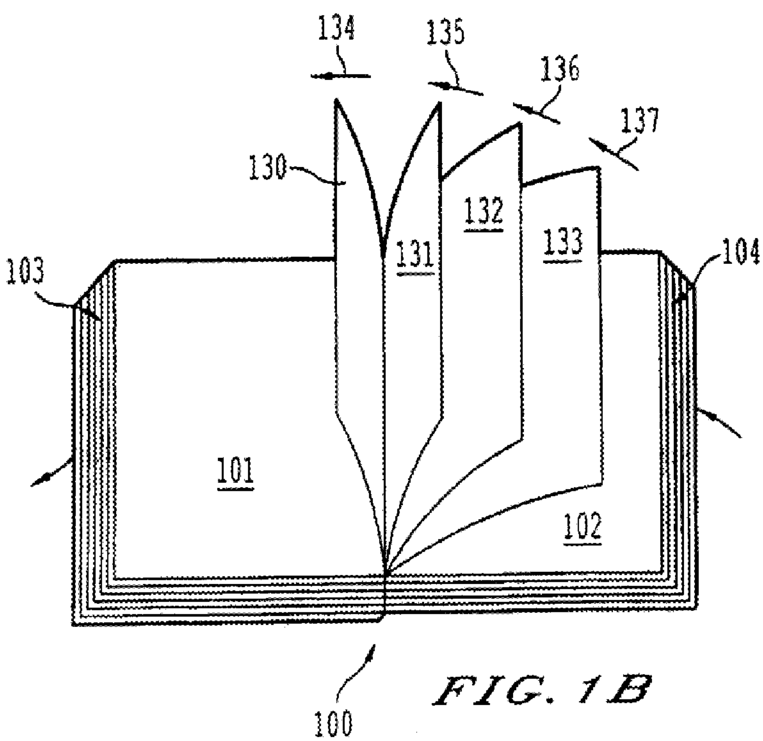
Figure 1C:
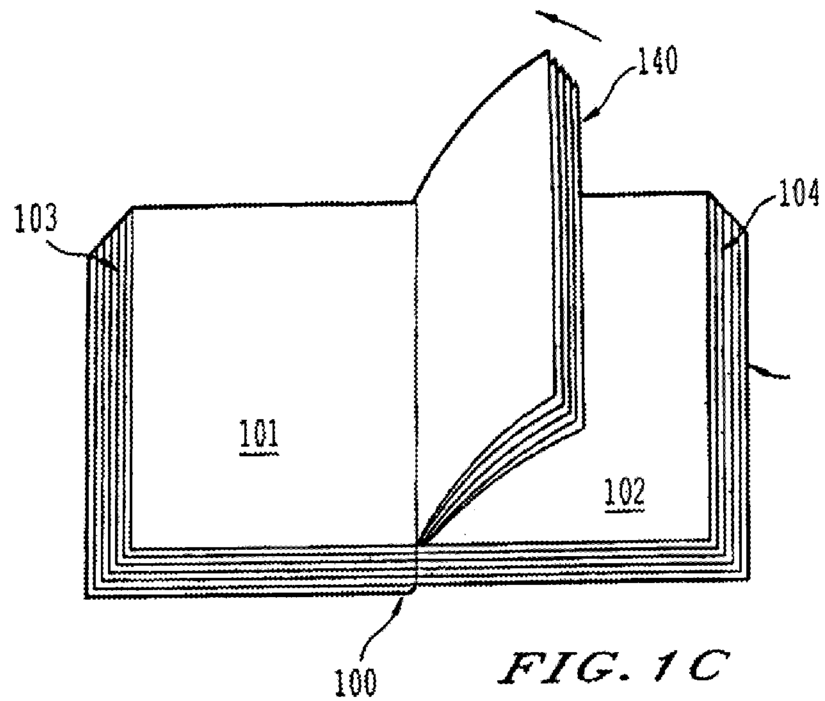
Figure 1D:
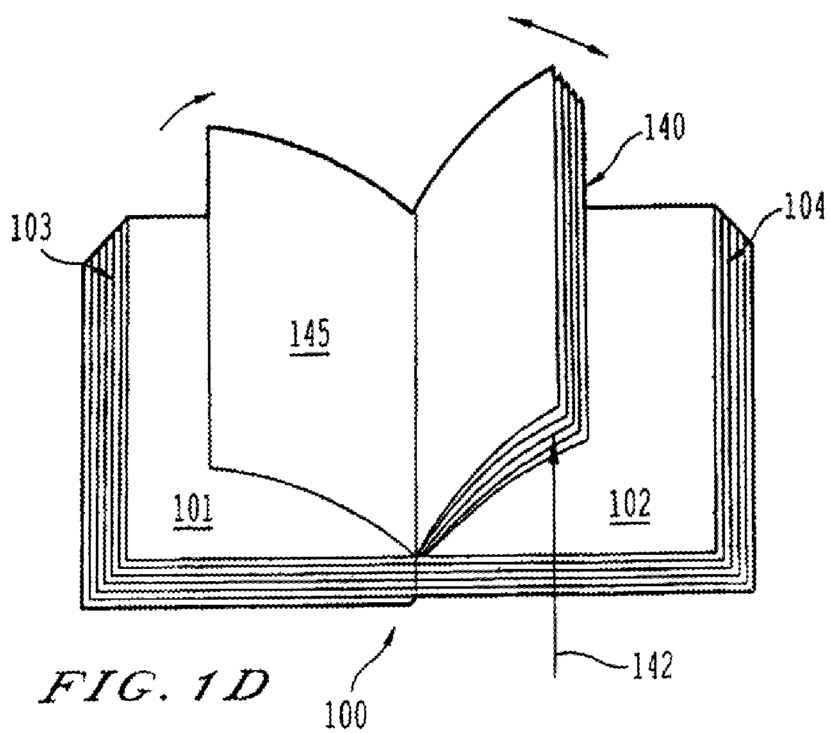
Figure 1E:
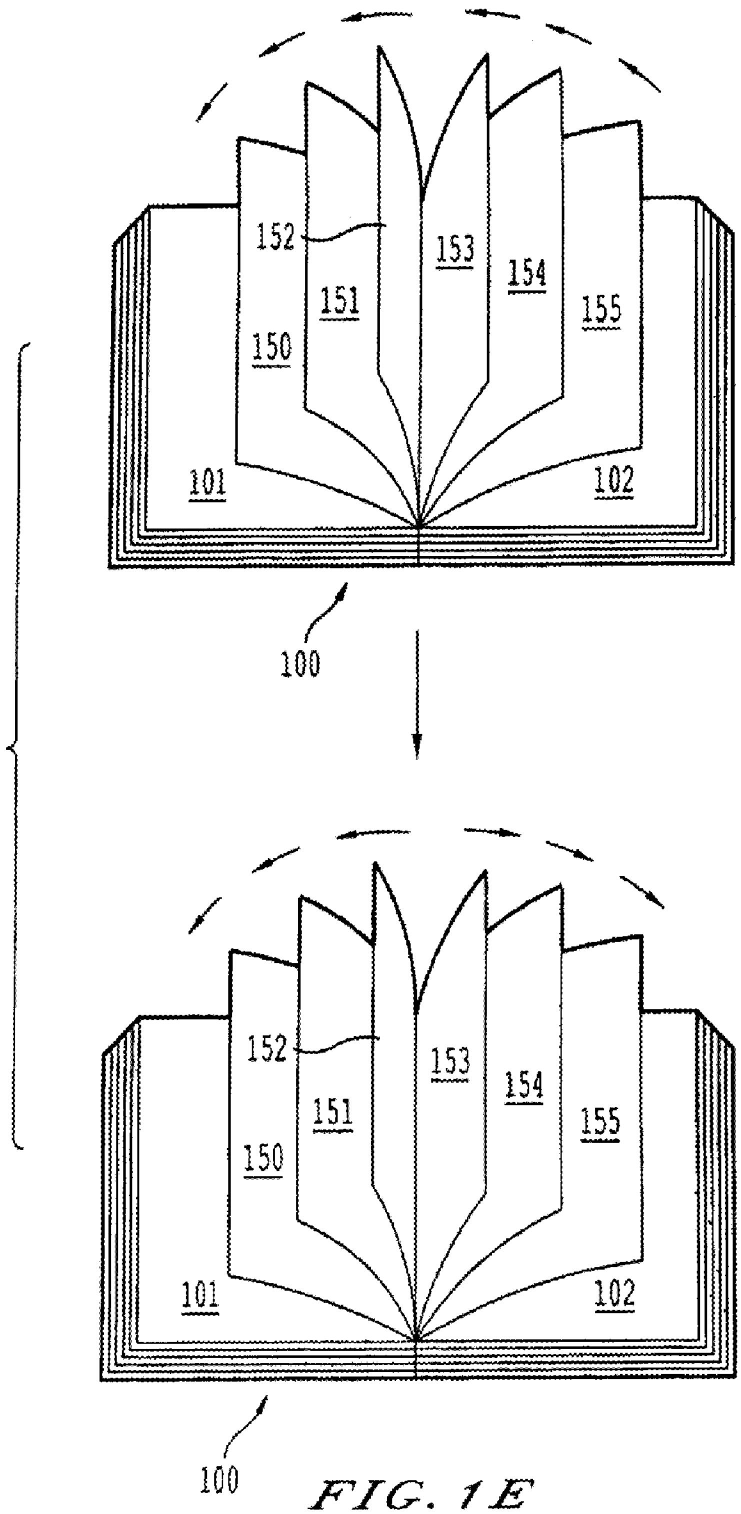
Figure 2:
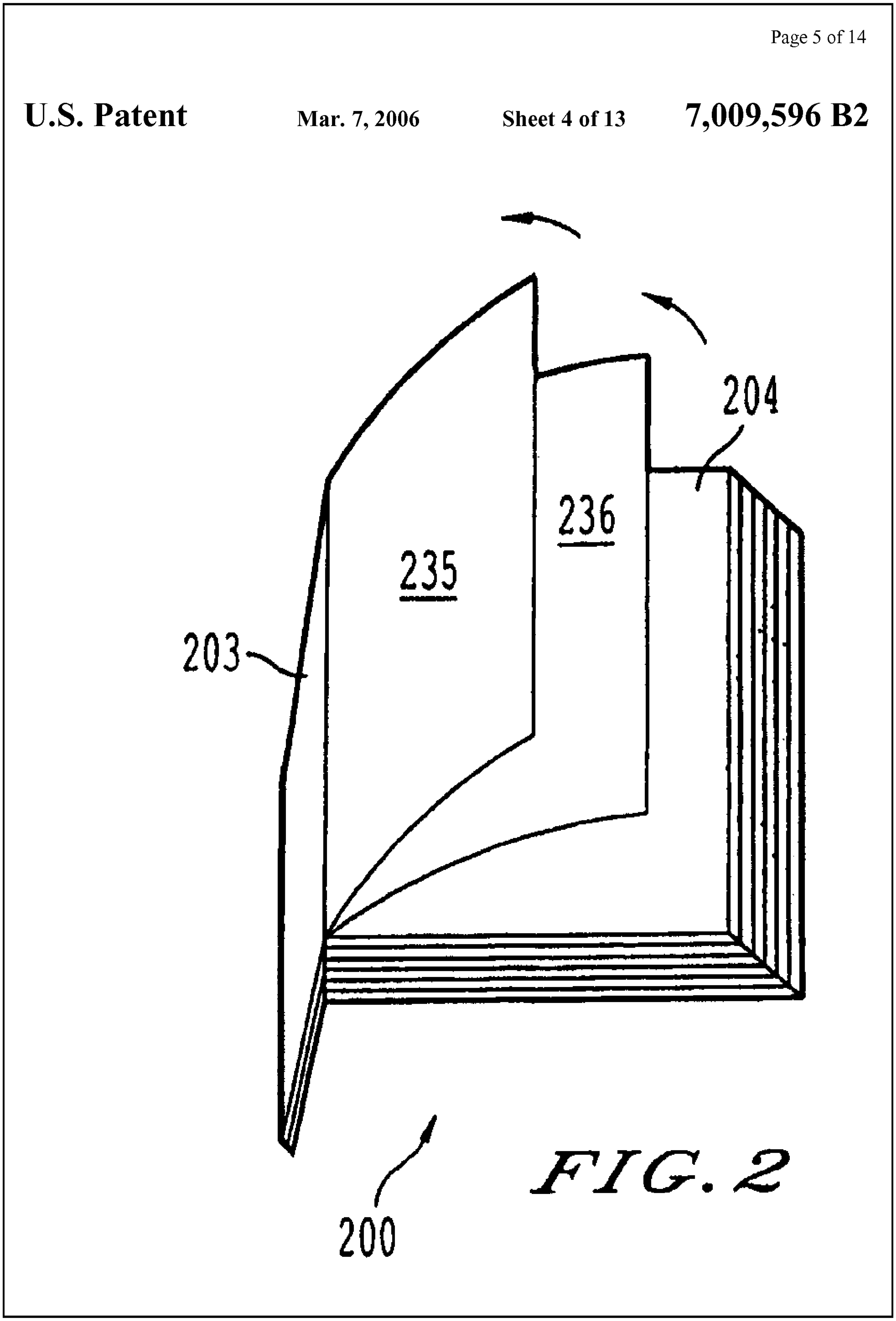
Figure 3:
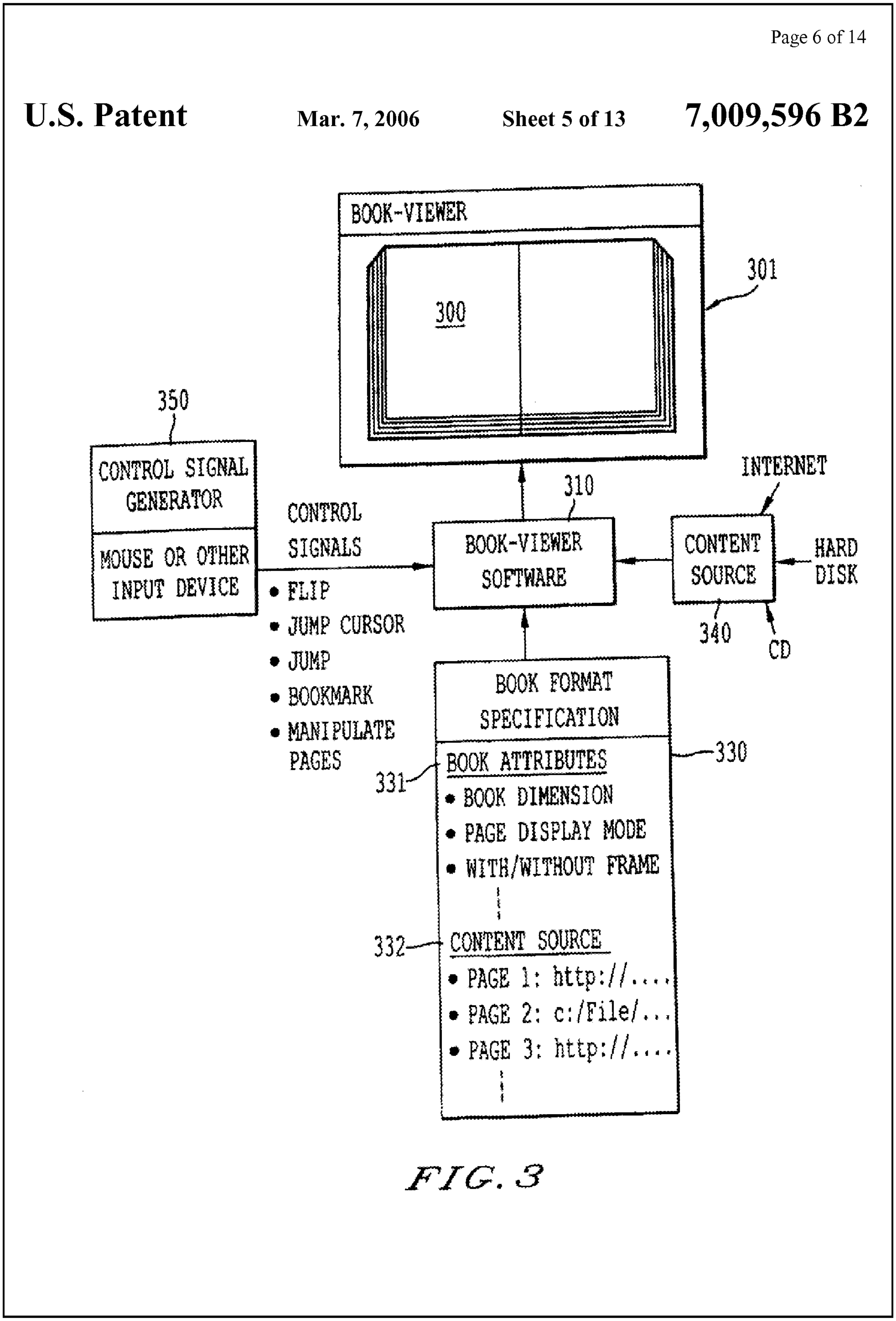
Figure 4:
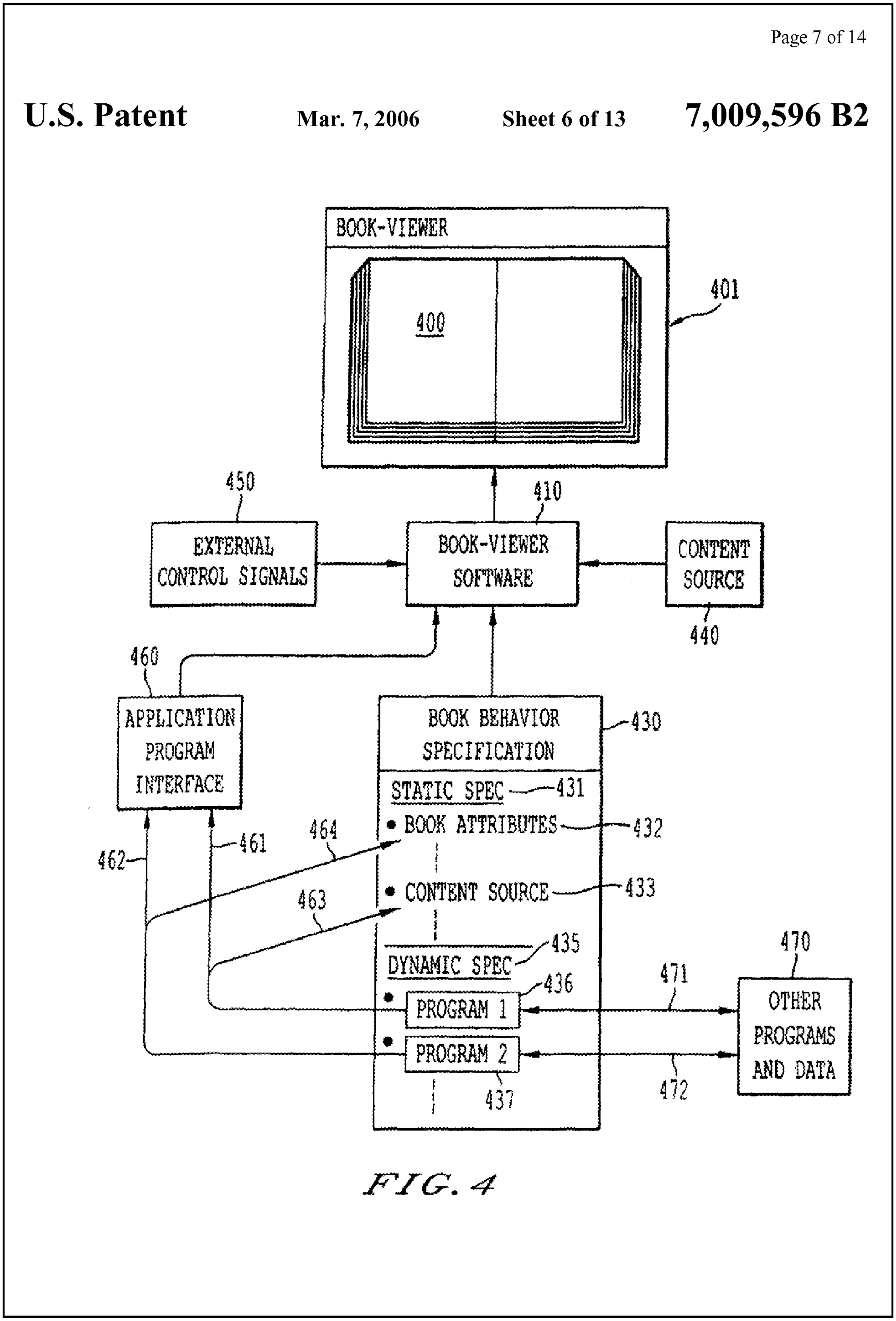
Figure 5:
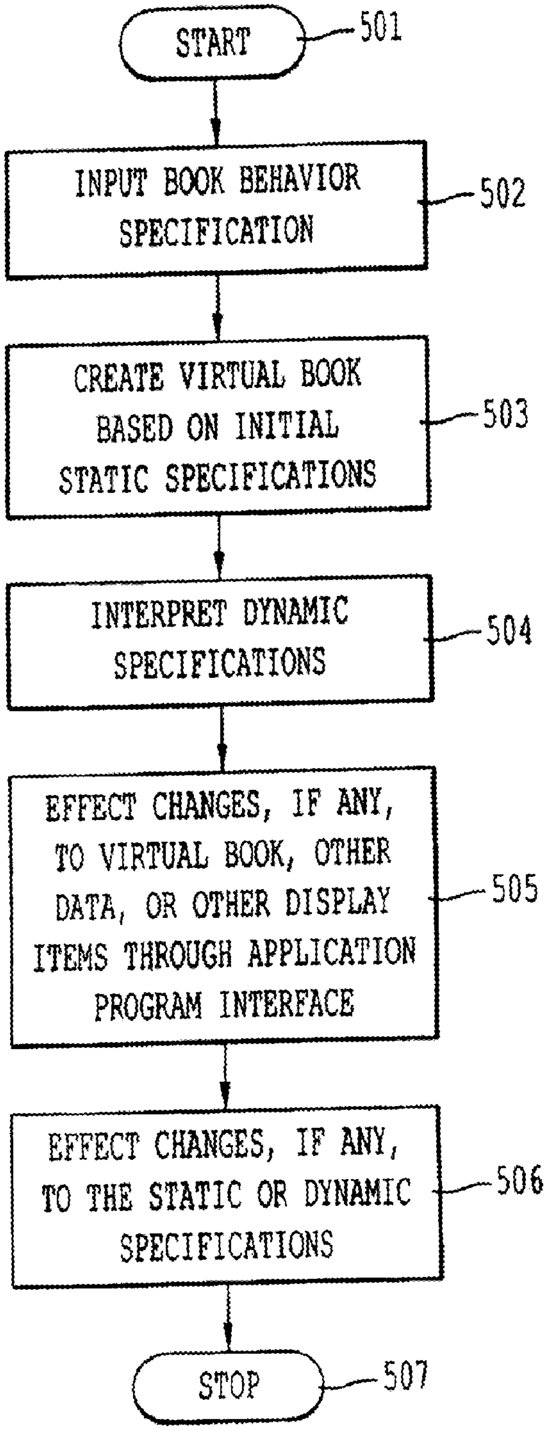
Figure 6A:
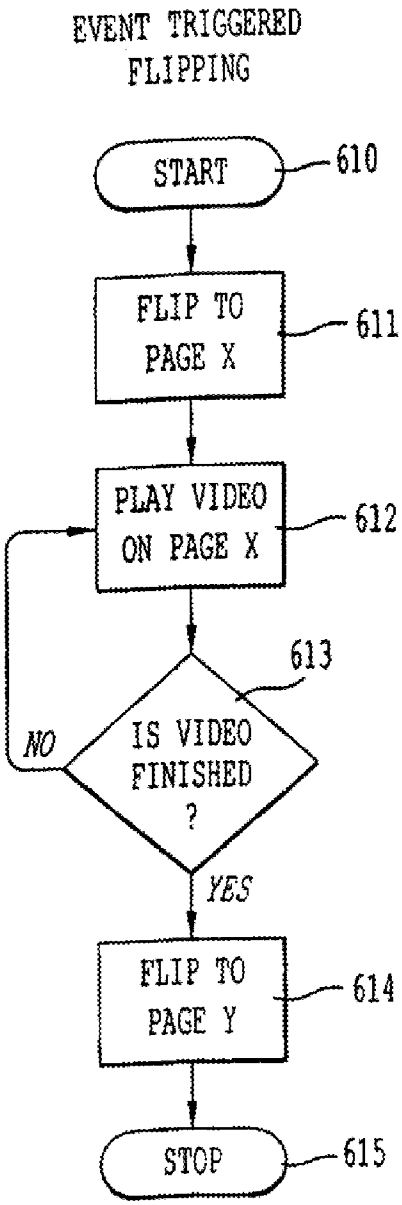
Figure 6B:
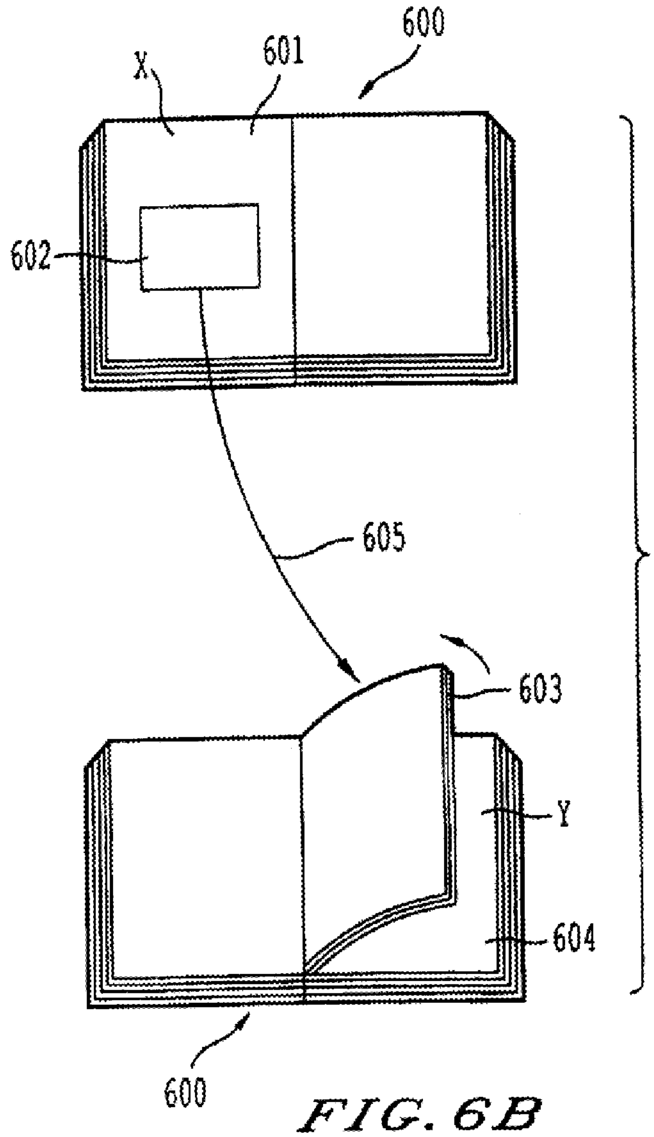
Figure 7:
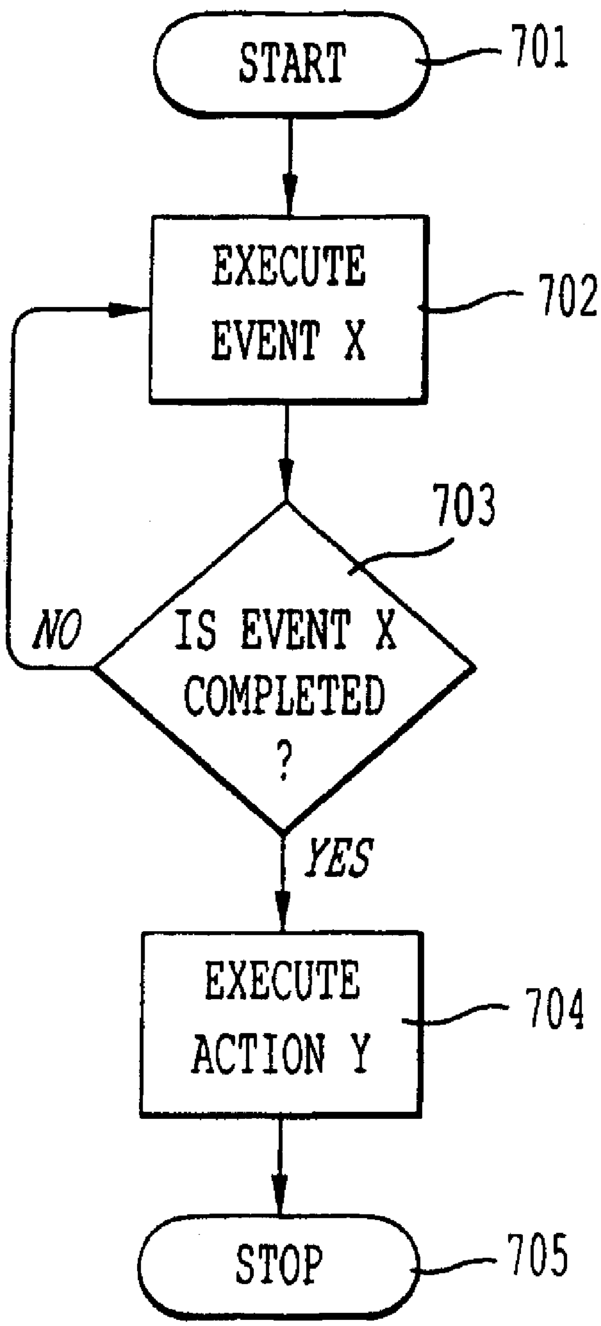
Figure 8A:
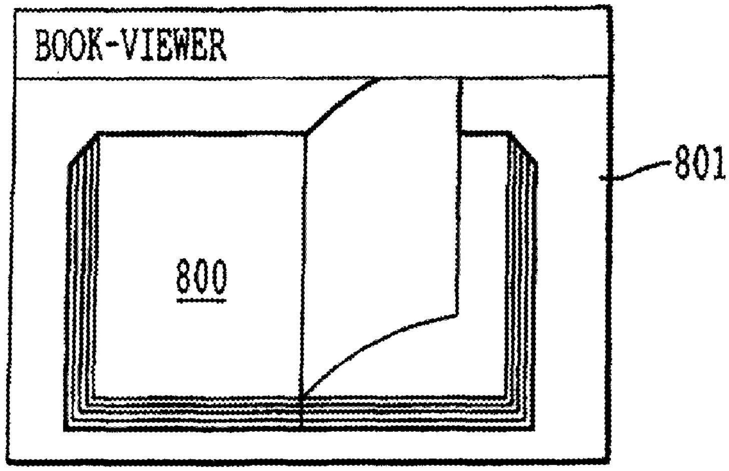
Figure 8B:
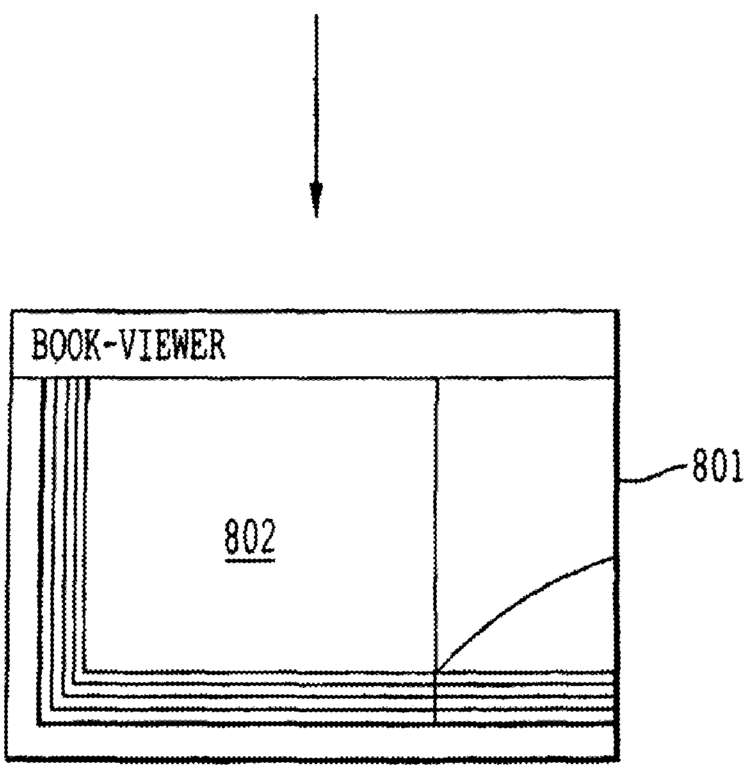
Figure 9:
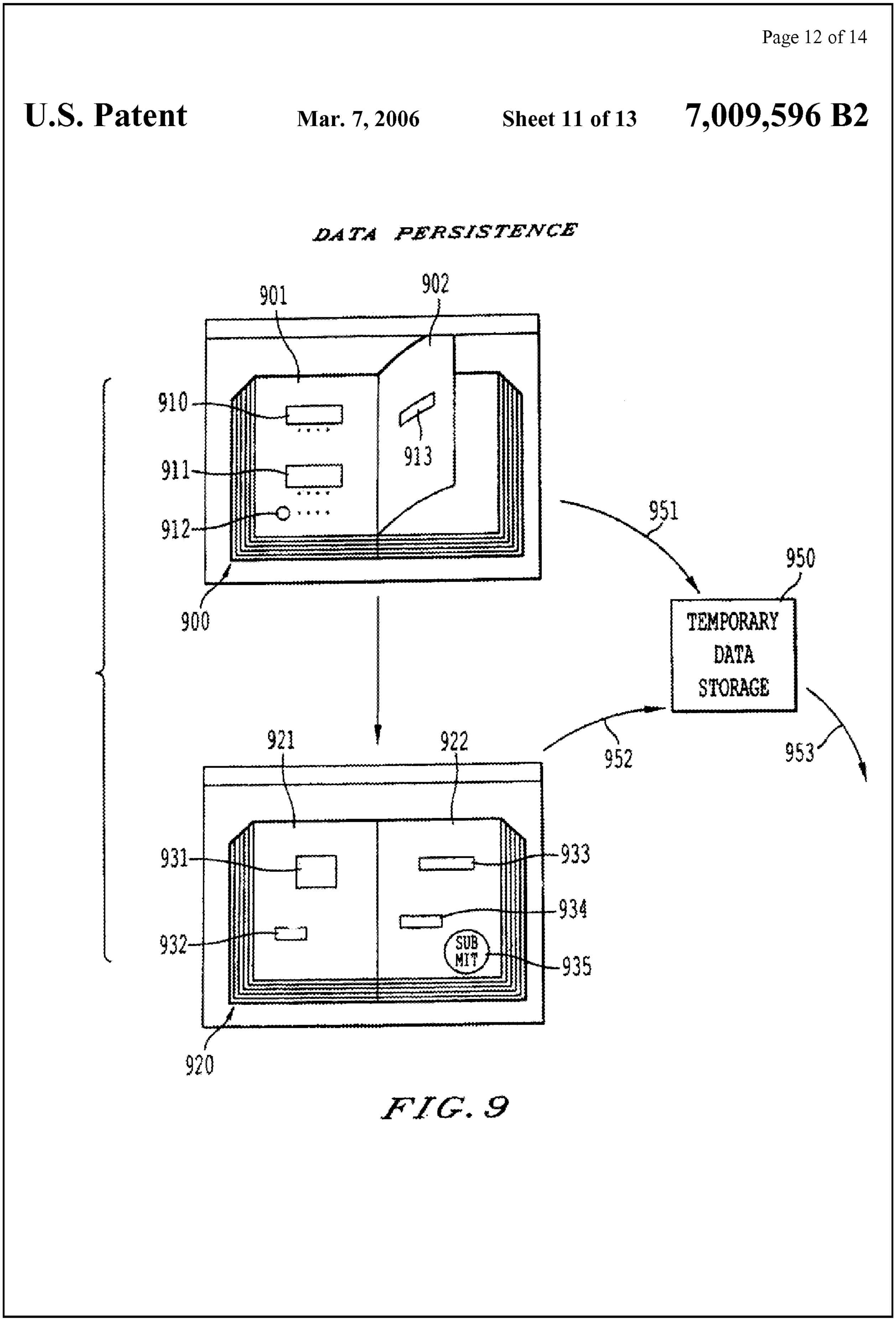
Figure 10:
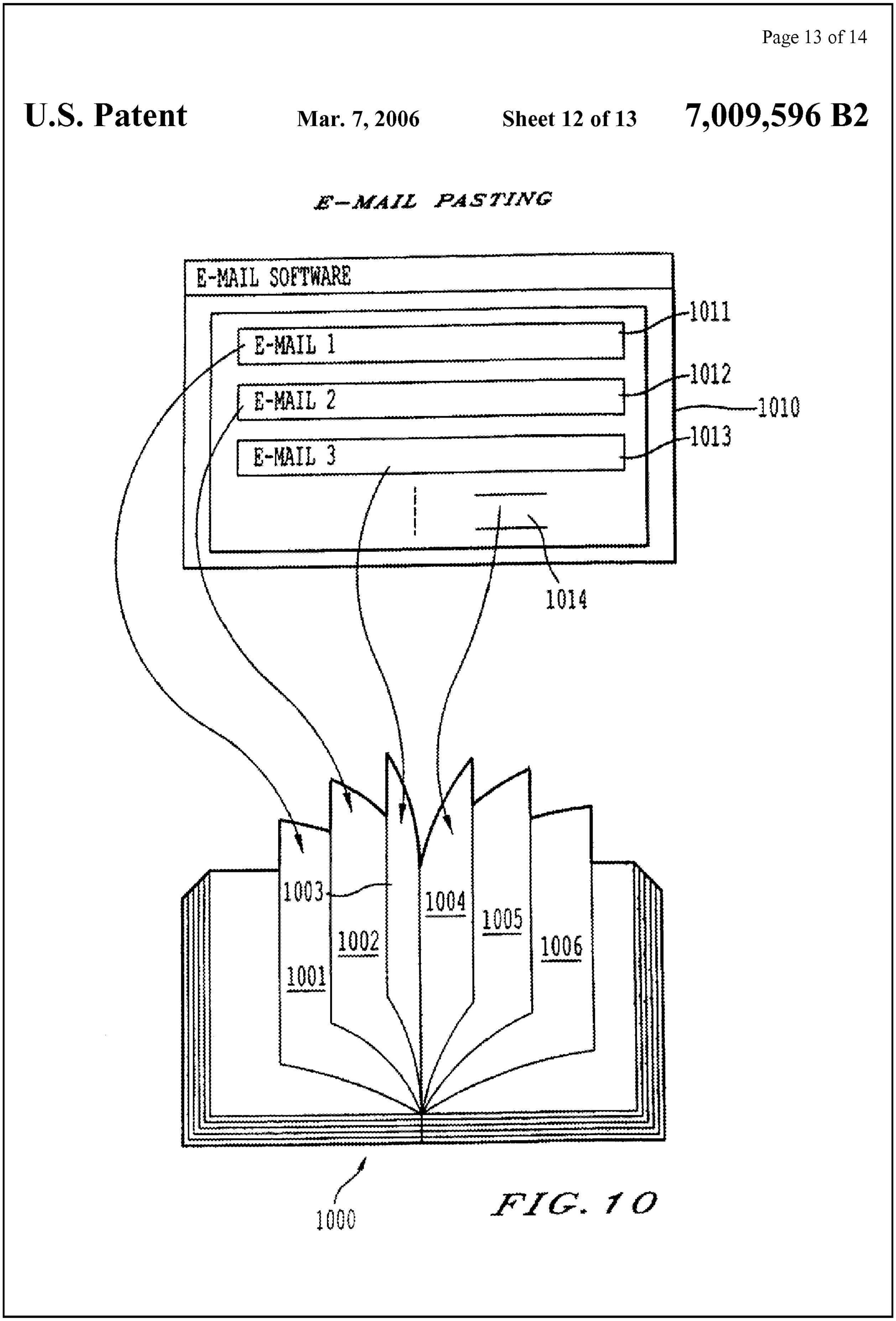
Figure 11A:
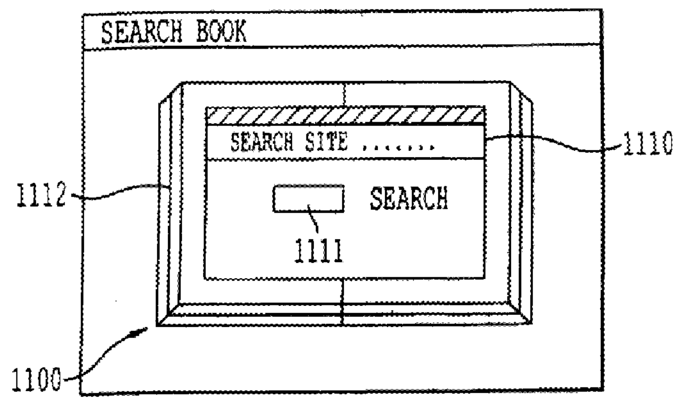
Figure 11B:
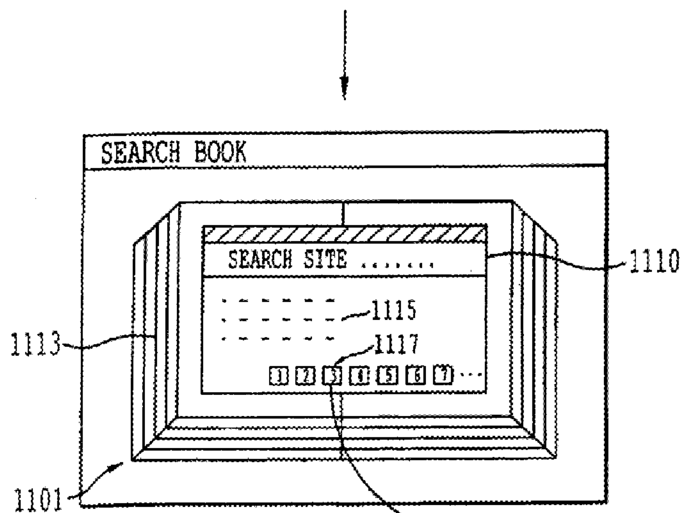
Figure 11C:
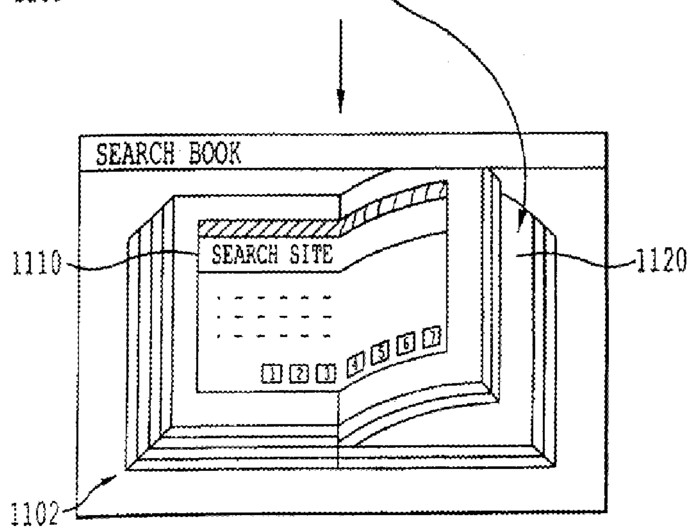
Figure 1A:
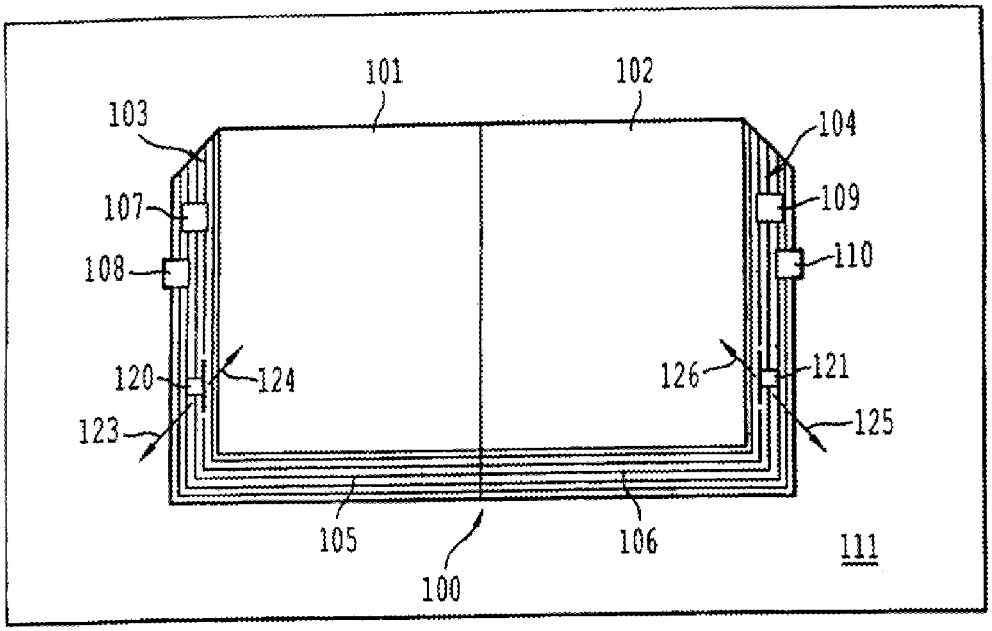
Figure 1B:
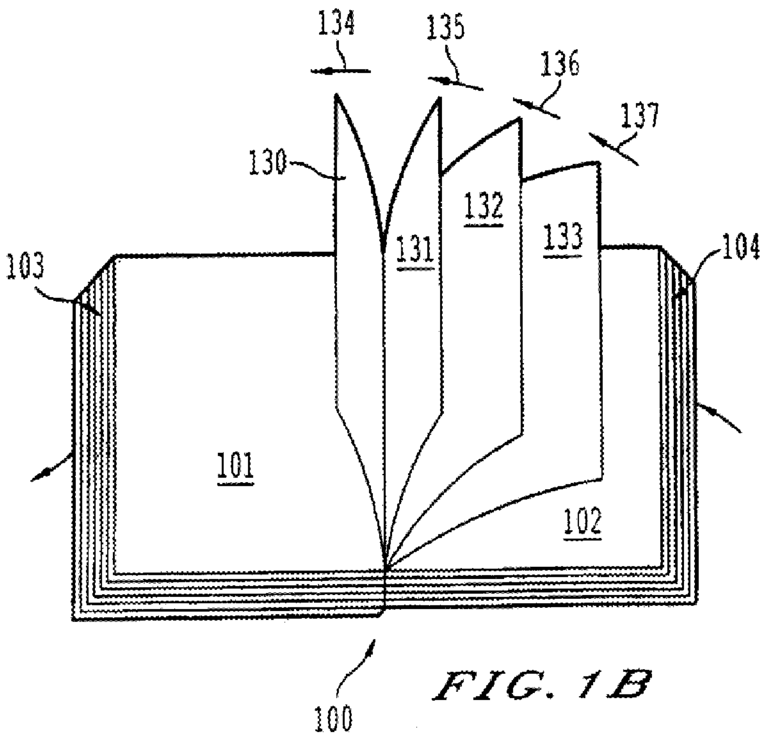
Figure 1C:
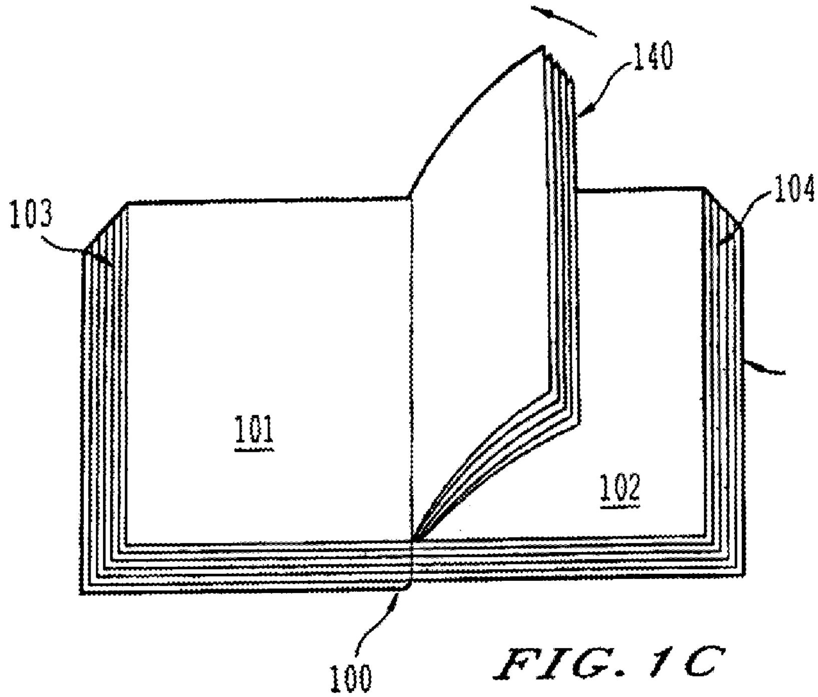
Figure 1D:
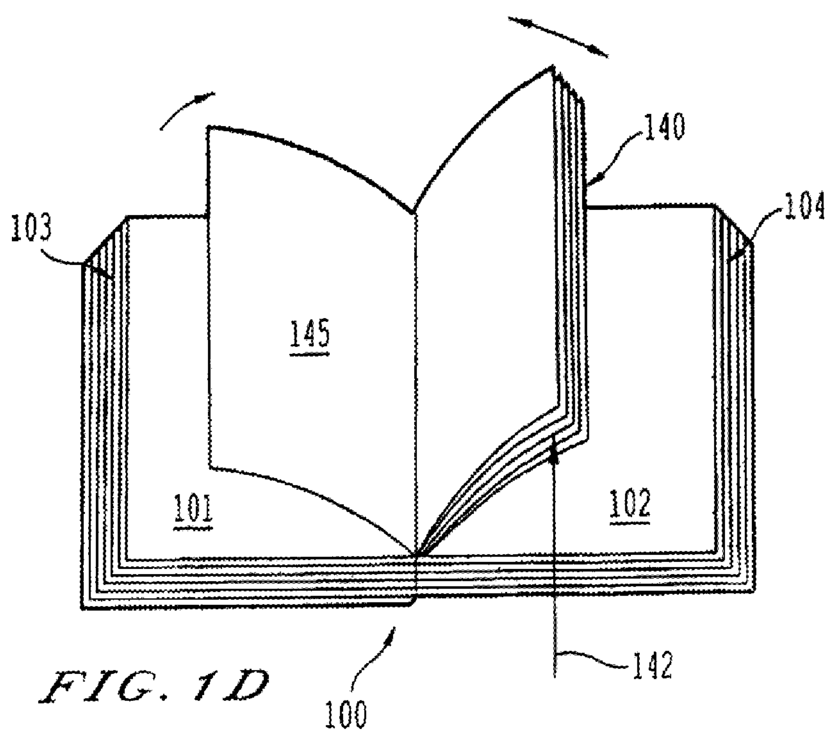
Figure 1E:
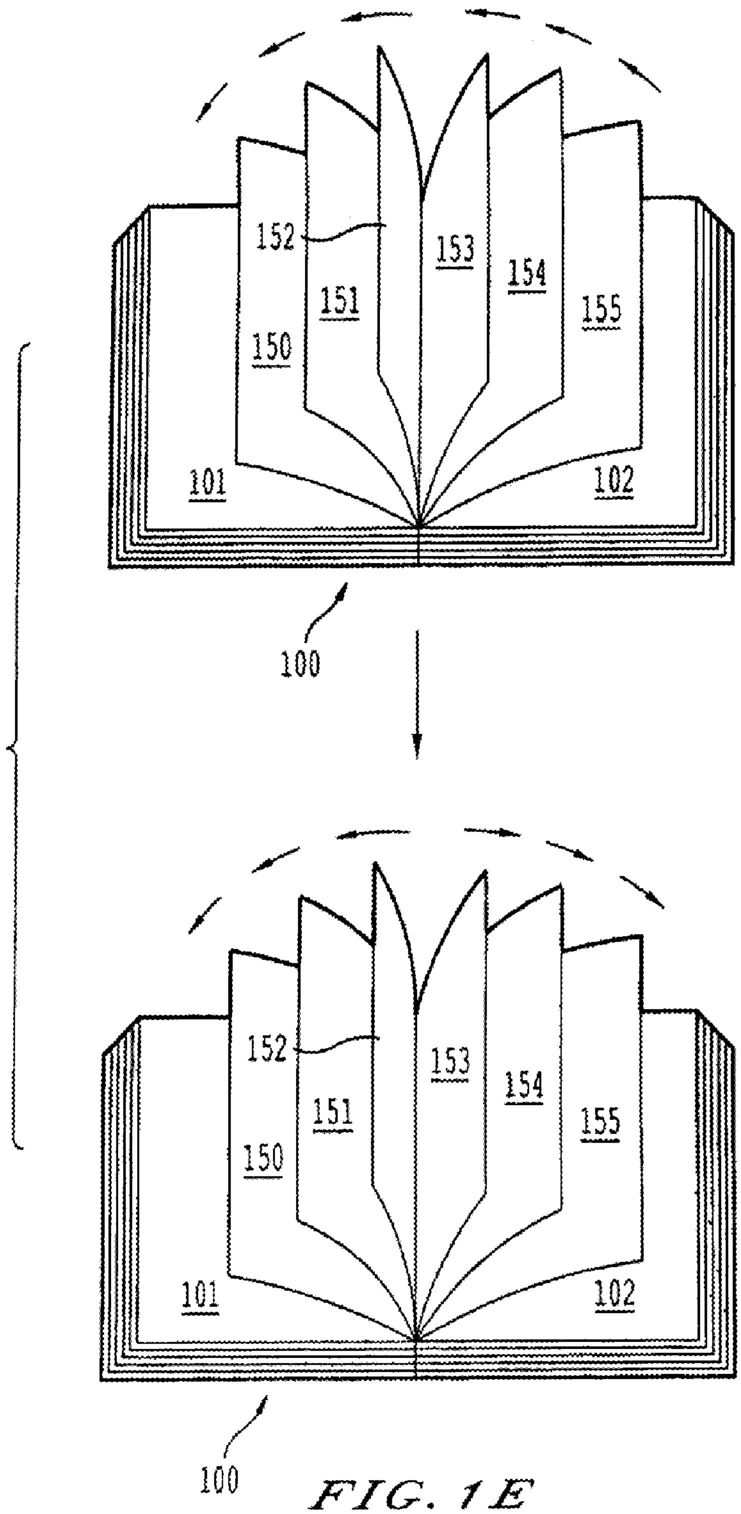
Figure 2:
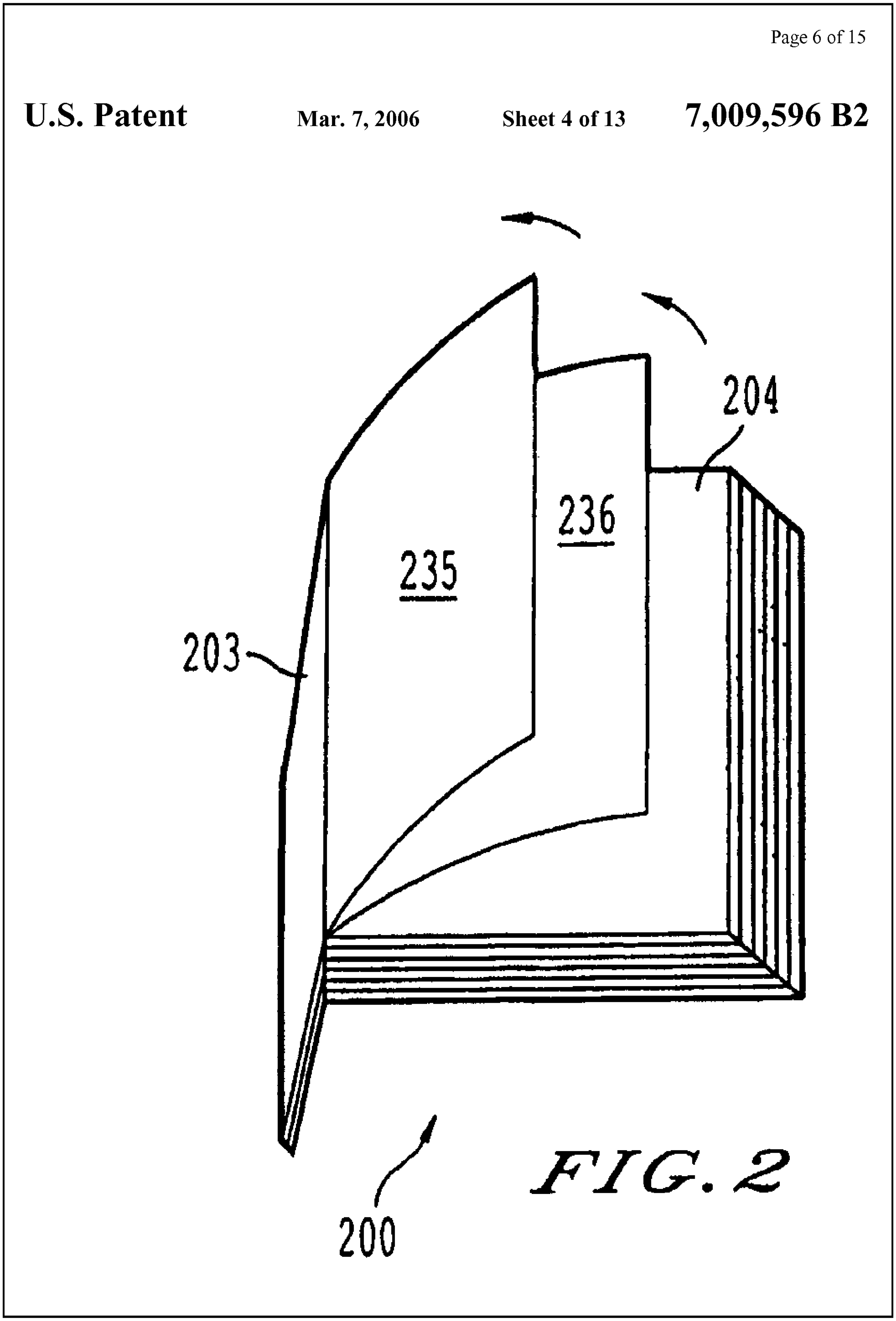
Figure 3:
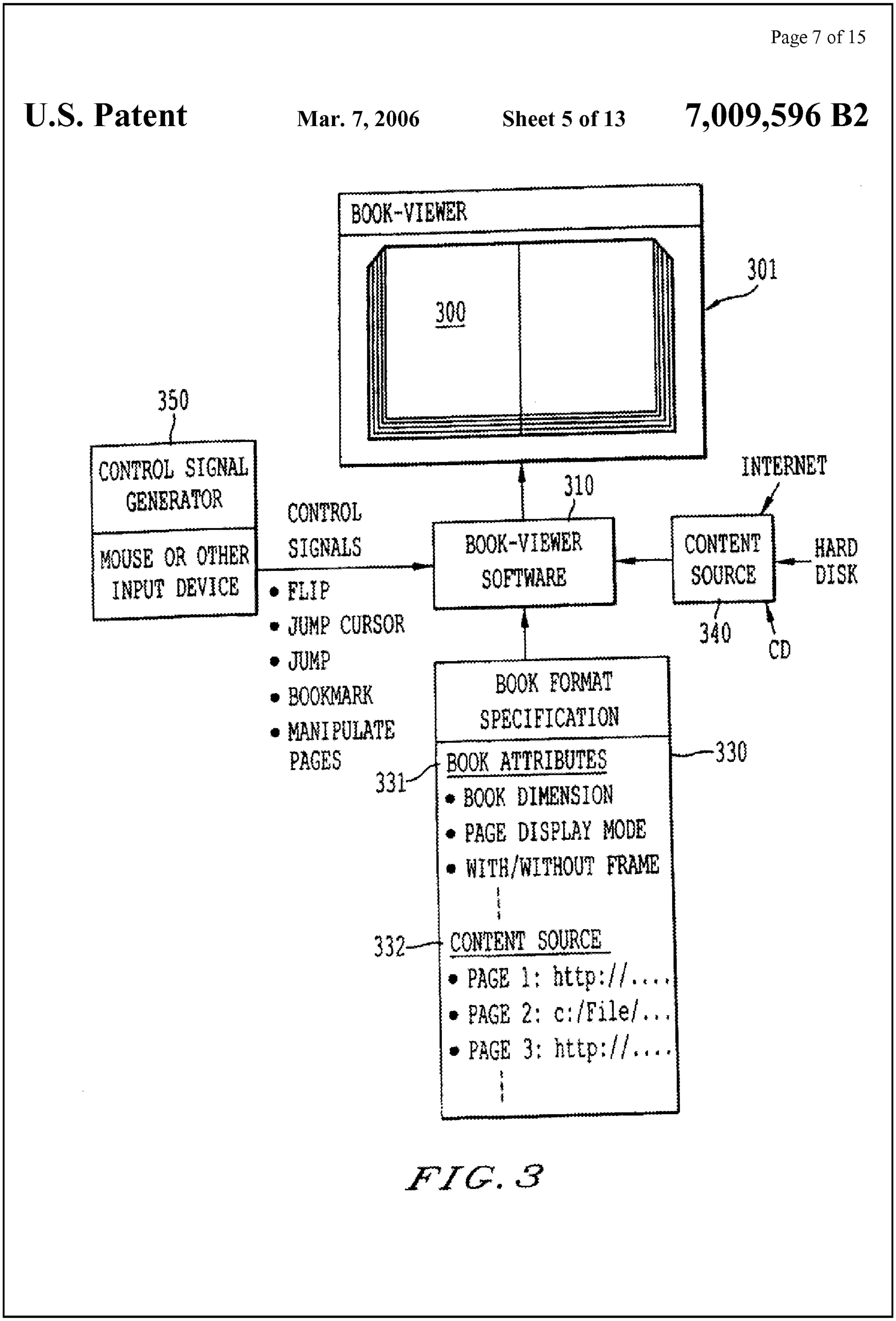
Figure 4:
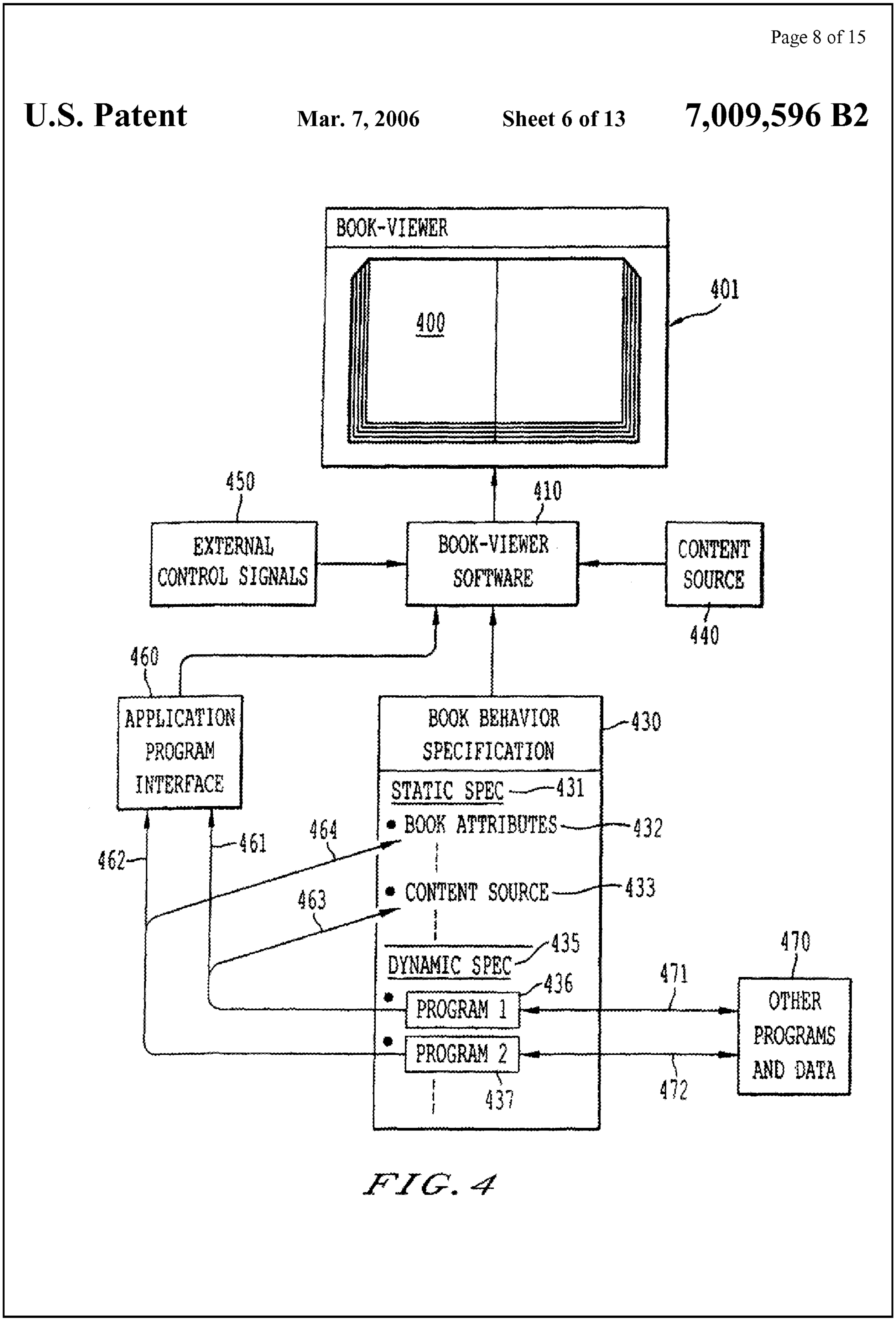
Figure 5:
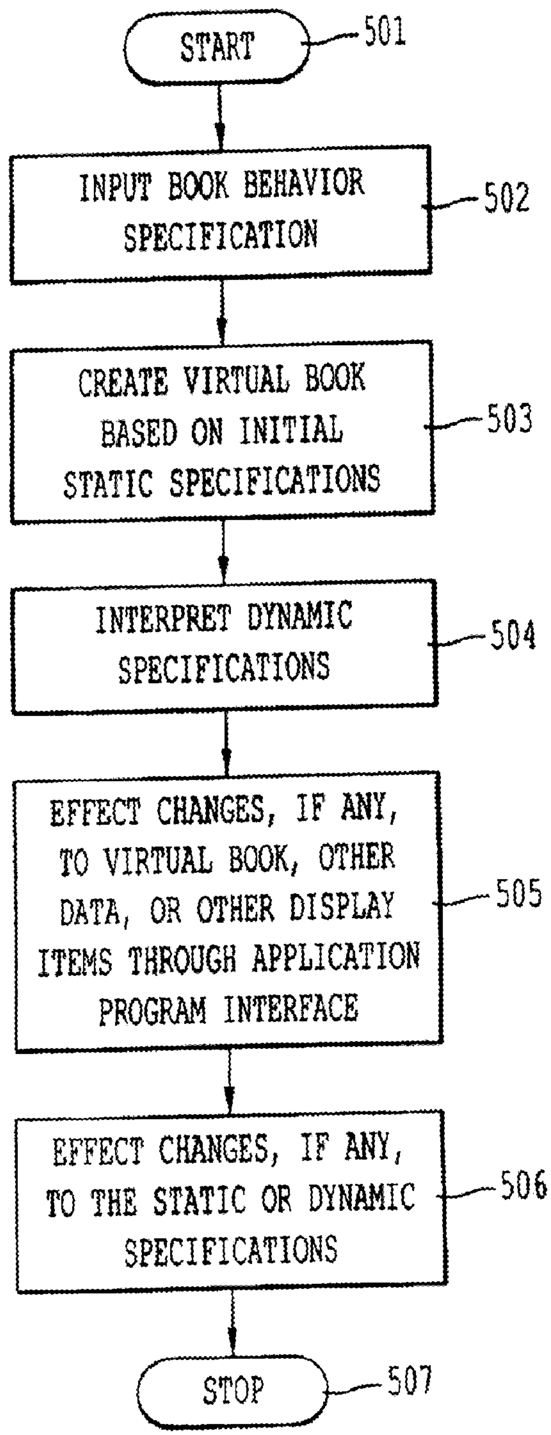
Figure 6A:
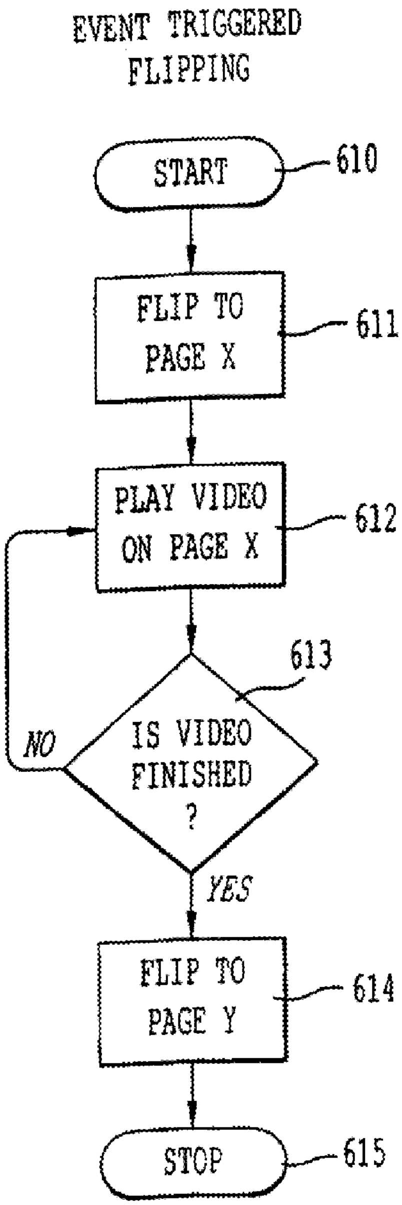
Figure 6B:
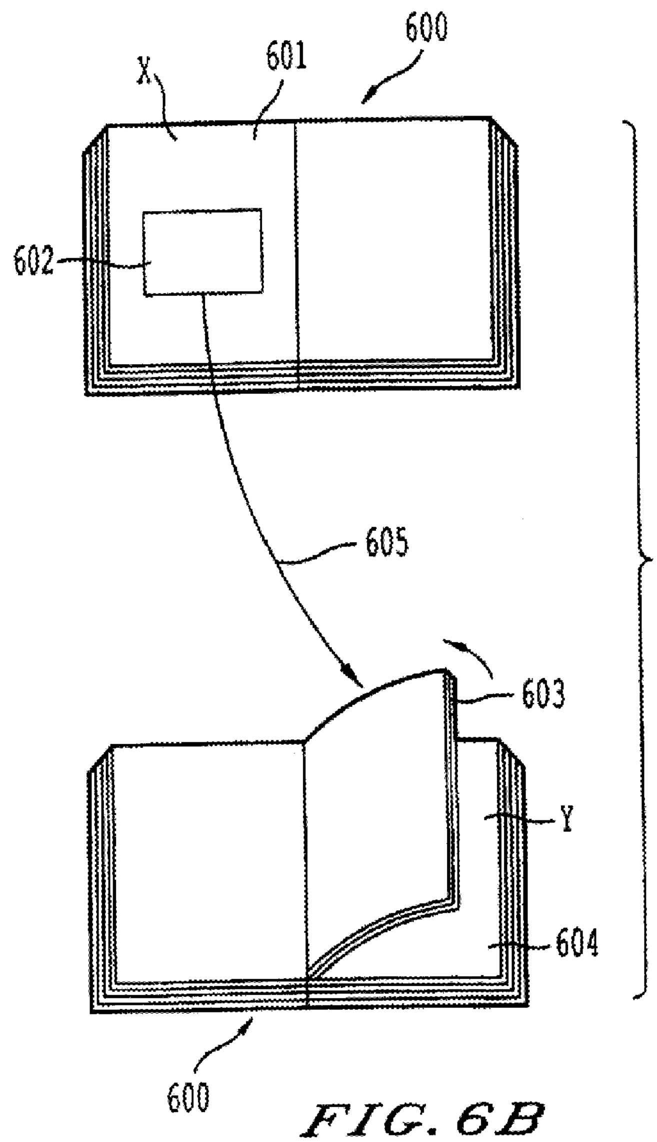
Figure 7:
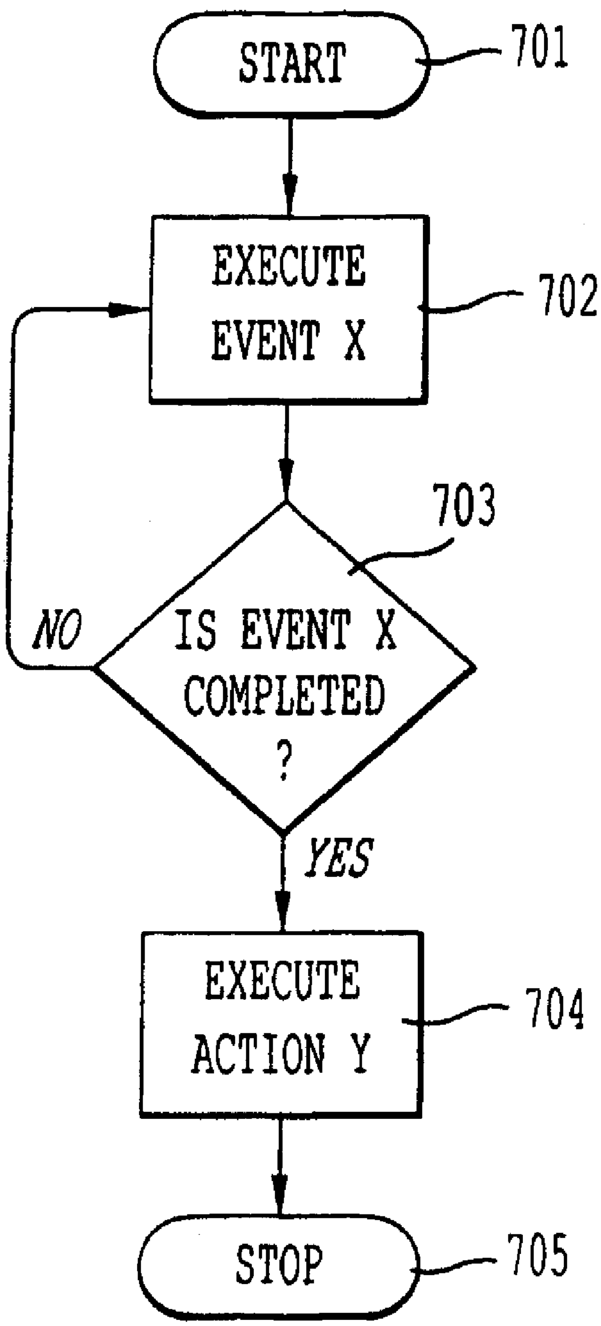
Figure 8A:
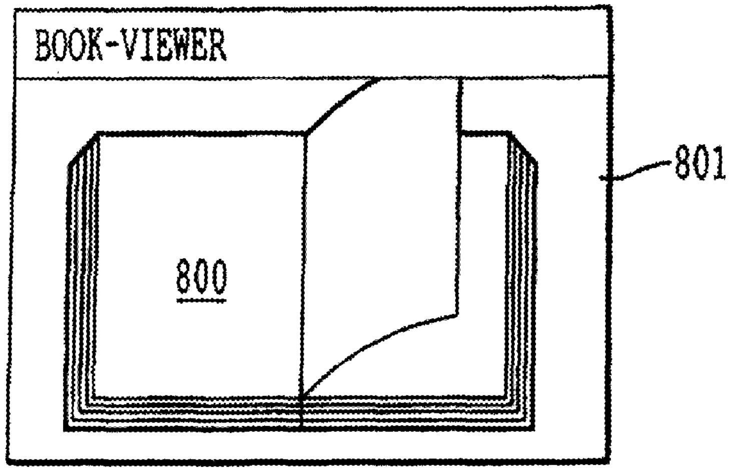
Figure 8B:
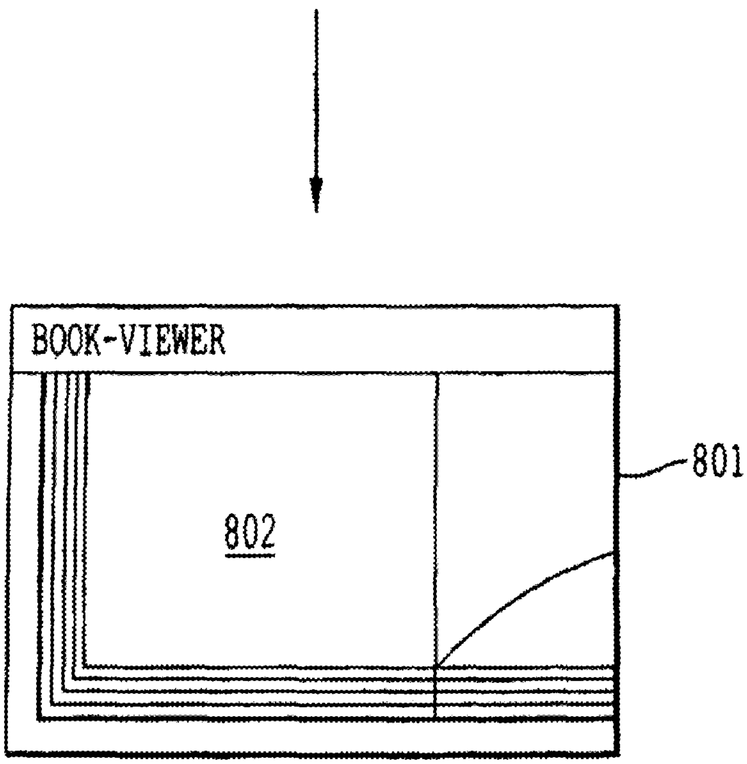
Figure 9:
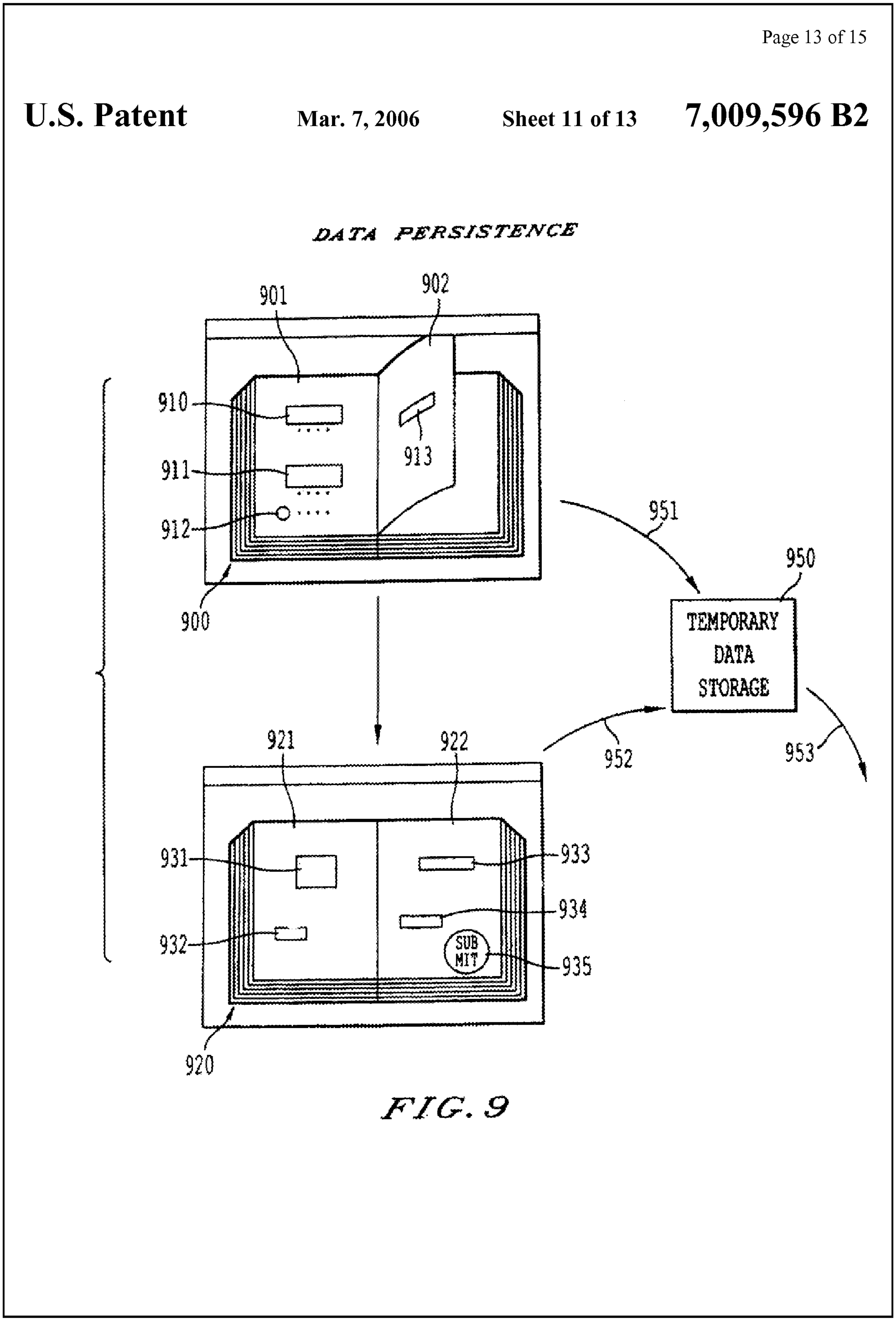
Figure 10:
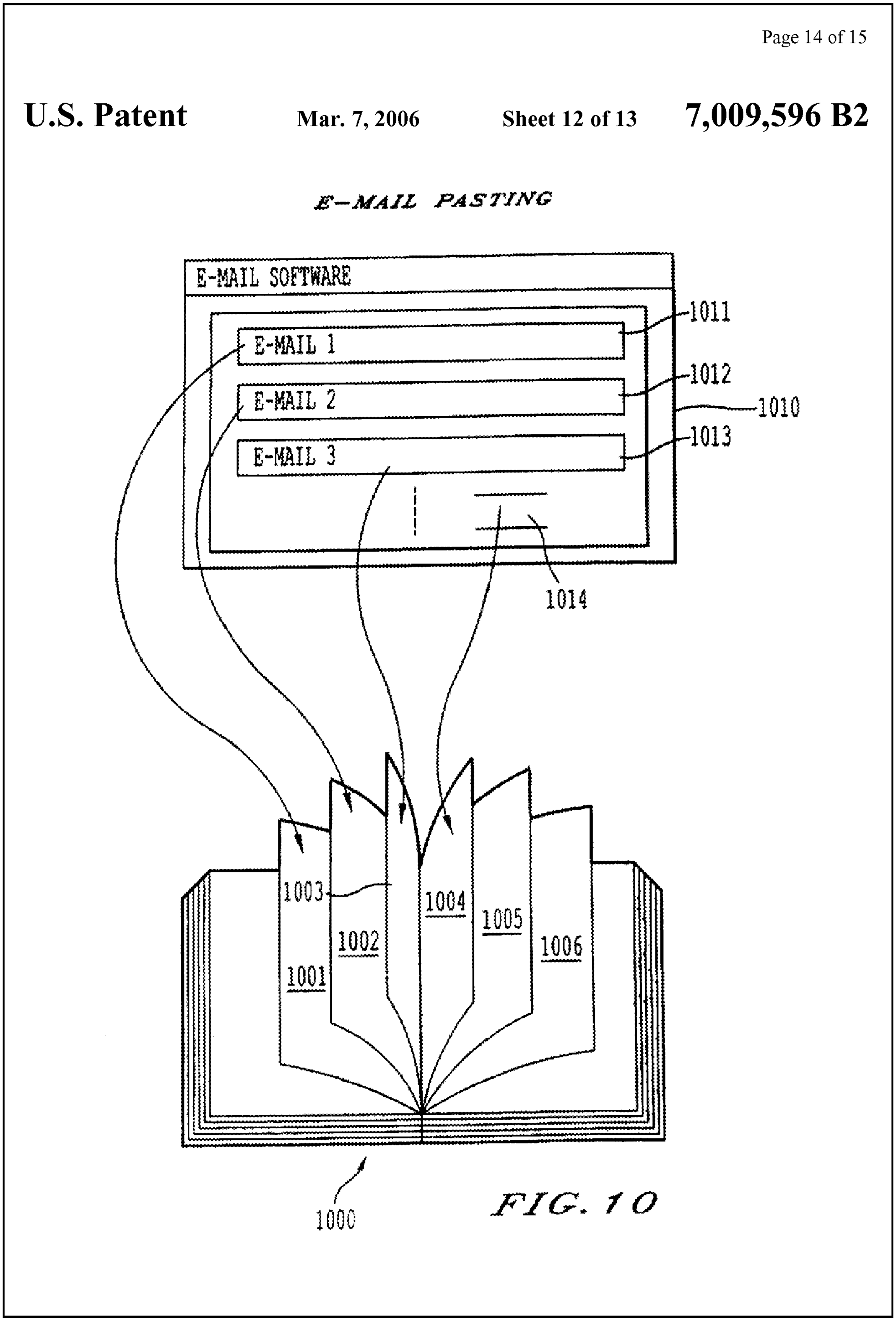
Figures 11A, 11B, 11C:
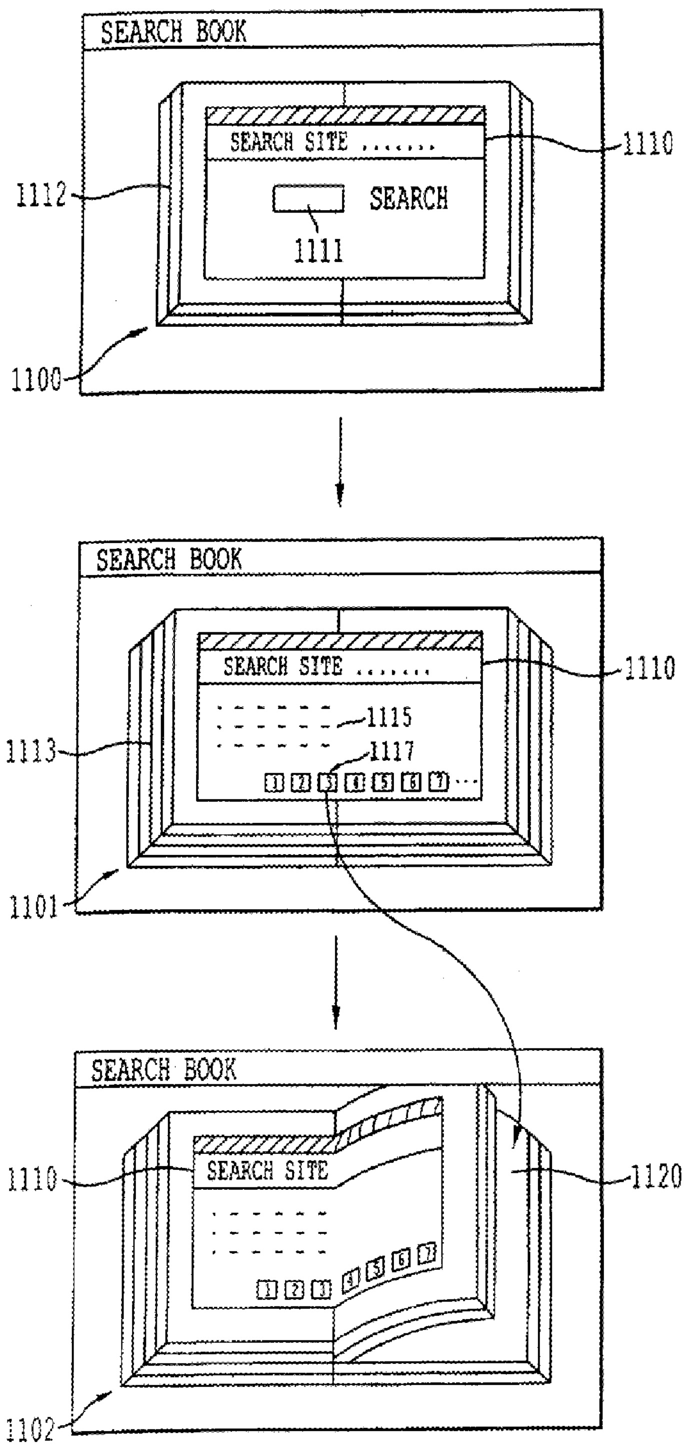

FIG. 11 depicts yet another use of the programmable virtual book system depicted in FIG. 4 in which a "search book" is created based on the output of a third-party search engine and presented in the virtual book form 1100. The process starts with a search book 1100 which has the capability of displaying contents from the Internet. Initially, a search engine site is being accessed and pasted in a two-page spread fashion 1110. The search book 1100 has zero thickness 1112 because other than the search engine site home page 1110, the search book 1100 contains no other data at this time. Now, suppose a search keyword is being entered into the search text box 1111 and a command is given to carry out the search. The search results are then pasted on a number of pages in the virtual book 1101 and the virtual book 1101 shows a sizeable thickness 1113 corresponding to the pages that contain the search results. On the home page of the search site 1110 some parts of the search results are also displayed 1115. At the bottom of the home page 1110 a few button are displayed 1117 that point to the various "pages" of the rest of the search results. Such is the typical method well-known search engine sites (e.g., www-.google.com) display their search results—i.e., some of the results are displayed on the home page and the rest are put "behind" on a number of pages that will be called forth when the buttons at the bottom 1117 are clicked. However, now, in the virtual book 1101, instead of calling forth one page at a time and displaying it on the clicking of the buttons 1117, all the results are pre-generated and displayed on the pages in the virtual book 1101. This way, the user can jump to any desired page at any time and the rest of the search results are instantly available. In the virtual book 1102 it is shown that when one of the buttons 1117 is clicked the virtual book 1102 flips to the page 1120 on which some of the search results are displayed. The virtual book 1102 method of displaying search results allow all the results to be instantly available as and when the user desires to view them, unlike in the case of the original search and display mechanism in which only one page of results is displayed at a time when it is being accessed. Further more, because of the delay of the Internet, the user often has to wait for a significant amount of time before these pages can be downloaded into the Internet browser and displayed. In the virtual book system, the delay of the Internet is overcome by the fact that pages of results are pre-loaded while other pages are being viewed.

To implement the mechanism of FIG. 11, a Program (one of 436, 437, etc.) is embedded in the Book Behavior Specification 430 of the virtual book 1100 in the Dynamic Specification Section 435. This Program (one of 436, 437, etc.) interacts with the search engine (through pathways 471, 472, etc. depicted in FIG. 4. The seach engine corresponds to the Other Programs and Data block 470) and collects the search results and lays them out on a number of pages in the virtual book 1100, and these pages have to be generated and added to the virtual book as shown in the virtual book 1101. This is a good example of the Programs, 436, 437, etc., in the Dynamic Specification Section 435 of the Book Behavior Specification 430 interacting with and instructing the Book-Viewer Software 410 through the Application Program Interface 460 to effect changes on some basic properties of the virtual book 1100 such as increasing its number of pages and loading these pages with some contents. The programmable virtual book systems as depicted in FIG.4 thus provides a lot of flexibility in generating virtual books that provide convenience to the user in the browsing, searching and reading of electronic contents.

All the functionalities described in FIGS. 6–11 can also be implemented by hard-coding the Book-Viewer Software 410 (FIG. 4) to generate the desired behavior and functionalities. Hence, as a result, no programs embedded in the Dynamic Specification Section 435 of the Book Behavior Specification 430 are needed. However, as mentioned above, this will in general lead to more time and costs spent in software development.

In addition to the methods described herein, a corresponding computing system (e.g., desktop, laptop, notebook, mobile phone, personal digital assistant (PDA), television, etc) and computer program product (software, firmware, network downloadable products, and products available over portable media (e.g., CD, DVD, diskette)) are envisioned.

While particular embodiments of the present invention have been illustrated and described, it will be appreciated that numerous changes and modifications will occur to those skilled in the art, and it is intended that the appended claims cover all those changes and modifications which fall within the spirit and scope of the present invention.

Obviously numerous modifications and variations of the present invention are possible in light of the above teachings. It is therefore to be understood that within the scope of the appended claims, the invention may be practiced otherwise than specifically described herein.

What is claimed is:

1. A method for controlling an electronic book, comprising steps of:

controlling at least a display of said electronic book with an electronic book behavior specification, said electronic book behavior specification containing both a static specification and a dynamic specification, said dynamic specification configured to allow an electronic book behavior to be initiated or modified via a user-initiated command or an automatically-initiated command, wherein said step of controlling said electronic book with a dynamic specification comprises at least one of:

controlling event triggered page flipping;

controlling an electronic book auto-flipping; and controlling an electronic book auto-narration.

2. The method of claim 1, wherein said step of controlling said electronic book with an electronic book behavior specification containing a static specification comprises at least one of:

controlling an electronic book attribute; and controlling a content source.

3. The method of claim 1, wherein said step of controlling said electronic book with a dynamic specification comprises:

controlling an electronic book run-time behavior.

4. The method of claim 1, wherein said step of controlling said electronic book with a dynamic specification comprises:

instructing a predetermined dynamic behavior to be effected on the virtual book through an application program interface configured to send an instruction to an electronic book-viewer software module.

5. The method of claim 1, wherein said step of controlling said electronic book with a dynamic specification comprises:

modifying the static specification within the electronic book behavior specification.

6. The method of claim 1, wherein said step of controlling said electronic book with a dynamic specification comprises:

controlling said electronic book with a dynamic specification provided by an external module.

7. The method of claim 1, wherein said step of controlling said electronic book with a dynamic specification comprises:

controlling said electronic book with a control signal from an external input device or an external program.

8. The method of claim 1, wherein said step of controlling said electronic book with a dynamic specification comprises:

controlling said electronic book with a dynamic specification provided by the electronic book behavior specification.

9. The method of claim 8, wherein the dynamic specification and the static specification are either encapsulated within a common software module or are encapsulated within respective software modules.

10. The method of claim 1, wherein said step of controlling said electronic book with a dynamic specification comprises:

controlling an electronic book auto-zoom.

11. The method of claim 1, further comprising a step of:

temporarily storing one of said static and dynamic specification for use across a predetermined number of pages.

12. The method of claim 1, wherein said step of controlling said electronic book with a dynamic specification comprises:

controlling a transfer of data onto a page via e-mail.

13. The method of claim 1, wherein said step of controlling said electronic book with a dynamic specification comprises:

controlling page-based searching, said page-based searching conducted via a search engine.

14. A method for controlling an electronic book, comprising steps of:

reading and interpreting an electronic book behavior specification including an initial static specification;

creating the electronic book based on the initial static specification, said electronic book including an electronic book behavior;

interpreting a dynamic specification, said dynamic specification configured to allow another electronic book behavior to be initiated or said electronic book behavior to be modified via a user-initiated command or an automatically-initiated command, and provided by at least one of said book behavior specification, an external book behavior specification, and an input device;

changing an electronic book behavior in response to the dynamic specification, wherein said step of changing an electronic book behavior comprises at least one of:

controlling event triggered page flipping;

controlling an electronic book auto-flipping; and controlling an electronic book auto-narration.

15. The method of claim 14, further comprising a step of:

changing said initial static specification in response the dynamic specification.

16. A system for controlling an electronic book, comprising:

means for controlling at least a display of said electronic book with an electronic book behavior specification, said electronic book behavior specification containing both a static specification and a dynamic specification, said dynamic specification configured to allow an electronic book behavior to be initiated or modified via a user-initiated command or an automatically-initiated command, wherein said means for controlling said electronic book with a dynamic specification comprises at least one of:

means for controlling event triggered page flipping;

means for controlling an electronic book auto-flipping; and means for controlling an electronic book auto-narration.

17. The system of claim 16, wherein said means for controlling said electronic book with a dynamic specification comprises:

means for controlling an electronic book run-time behavior.

18. A system for controlling an electronic book, comprising:

means for reading and interpreting an electronic book behavior specification including an initial static specification;

means for creating the electronic book based on the initial static specification, said electronic book including an electronic book behavior;

means for interpreting a dynamic specification, said dynamic specification configured to allow another electronic book behavior to be initiated or said electronic book behavior to be modified via a user-initiated command or an automatically-initiated command, and provided by at least one of said book behavior specification, an external book behavior specification, and an input device; and means for changing an electronic book behavior in response to the dynamic specification wherein said means for changing an electronic book behavior in response to the dynamic specification comprises at least one of:

means for controlling event triggered page flipping;

means for controlling an electronic book auto-flipping; and means for controlling an electronic book auto-narration.

19. The system of claim 18, further comprising:

means for changing said initial static specification in response the dynamic specification.

20. A computer program product configured to store instructions, which when executed by a computing device, enable the computing device to control an electronic book, said computer program product comprising:

an instruction for controlling said electronic book with an electronic book behavior specification, said electronic book behavior specification containing both a static specification and a dynamic specification, said dynamic specification configured to allow an electronic book behavior to be initiated or modified via a user-initiated command or an automatically-initiated command, wherein said instruction for controlling said electronic book with a dynamic specification comprises at least one of:

an instruction for controlling event triggered page flipping;

an instruction for controlling an electronic book auto-flipping; and an instruction for controlling an electronic book auto-narration.

21. The computer program product of claim 20, wherein said instruction for controlling said electronic book with a dynamic specification comprises:

an instruction for controlling an electronic book run-time behavior.

22. A computer program product configured to store instructions, which when executed by a computing device, enable the computing device to control an electronic book, said computer program product comprising:

an instruction for reading and interpreting an electronic book behavior specification including an initial static specification;

an instruction for creating the electronic book based on the initial static specification, said electronic book including an electronic book behavior;

an instruction for interpreting a dynamic specification, said dynamic specification configured to allow another electronic book behavior to be initiated or said electronic book behavior to be modified via a user-initiated command or an automatically-initiated command, and provided by at least one of said book behavior specification, an external book behavior specification, and an input device; and an instruction for changing an electronic book behavior in response to the dynamic specification, wherein said instruction for changing an electronic book behavior comprises at least one of:

an instruction for controlling event triggered page flipping;

an instruction for controlling an electronic book auto-flipping; and an instruction for controlling an electronic book auto-narration.

23. The computer program product of claim 22, further comprising:

an instruction for changing said initial static specification in response the dynamic specification.

* * * * *

UNITED STATES PATENT AND TRADEMARK OFFICE

CERTIFICATE OF CORRECTION

PATENT NO. : 7,009,596 B2
APPLICATION NO. : 10/760298
DATED : March 7, 2006
INVENTOR(S) : Chern H. Seet et al.

It is certified that error appears in the above-identified patent and that said Letters Patent is hereby corrected as shown below:

Delete Figs 1A-1E, 2-5, 6A and 6B, 7, 8A and 8B, 9, 10, 11A-11C and replace with the corrected figures:
Insert Figs 1A-1E, 2-5, 6A and 6B, 7, 8A and 8B, 9, 10, 11A-11C.

See attached drawings with the details.

Signed and Sealed this

Fifth Day of August, 2008

JON W. DUDAS
*Director of the United States Patent and Trademark Office*

DATA PERSISTENCE

E-MAIL PASTING

SEARCH BOOK CREATION

UNITED STATES PATENT AND TRADEMARK OFFICE

CERTIFICATE OF CORRECTION

PATENT NO. : 7,009,596 B2
APPLICATION NO. : 10/760298
DATED : March 7, 2006
INVENTOR(S) : Chern H. Seet et al.

It is certified that error appears in the above-identified patent and that said Letters Patent is hereby corrected as shown below:

Delete the title page and substitute therefor the attached title page.

Delete Figs 1A-1E, 2-5, 6A and 6B, 7, 8A and 8B, 9, 10, 11A-11C and replace with the corrected figures:
Insert Figs 1A-1E, 2-5, 6A and 6B, 7, 8A and 8B, 9, 10, 11A-11C.

See attached drawings with the details.

This certificate supersedes the Certificate of Correction issued August 5, 2008.

Signed and Sealed this

Twenty-sixth Day of August, 2008

JON W. DUDAS
*Director of the United States Patent and Trademark Office*

(12) United States Patent
Seet et al.

(10) Patent No.: US 7,009,596 B2
(45) **Date of Patent: *Mar. 7, 2006**

(54) PROGRAMMABLE VIRTUAL BOOK SYSTEM

(75) Inventors: Chern Hway Seet, Singapore (SG); Seng Beng Ho, Singapore (SG)

(73) Assignee: E-Book Systems PTE LTD, Singapore (SG)

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 10/760,298

(22) Filed: Jan. 21, 2004

(65) Prior Publication Data

US 2004/0201569 A1 Oct. 14, 2004

Related U.S. Application Data

(60) Provisional application No. 60/441,135, filed on Jan. 21, 2003.

(51) Int. Cl.
*G09G 5/00* (2006.01)

(52) U.S. Cl. .......................... 345/156; 345/901
(58) Field of Classification Search .............. 345/156, 345/901, 173
See application file for complete search history.

(56) References Cited

U.S. PATENT DOCUMENTS

| | | | |
|---|---|---|---|
| 5,417,575 A | 5/1995 | McTaggart | |
| 5,467,102 A | 11/1995 | Kuno et al. | |
| 5,909,207 A | 6/1999 | Ho | |
| 6,064,384 A * | 5/2000 | Ho | 345/839 |
| 6,229,502 B1 | 5/2001 | Schwab | |
| 6,320,591 B1 * | 11/2001 | Griencewic | 345/582 |
| 6,486,895 B1 | 11/2002 | Robertson et al. | |
| 6,747,680 B1 * | 6/2004 | Igarashi et al. | 345/784 |
| 2004/0039750 A1 * | 2/2004 | Anderson et al. | 707/103 R |

OTHER PUBLICATIONS

Open eBook Forum (EeB); Publication Structure 1.2; Recommended Specification Aug. 27, 2002; pp. 1-93.

* cited by examiner

*Primary Examiner*—Ricardo Osorio
(74) *Attorney, Agent, or Firm*—Oblon, Spivak, McClelland, Maier & Neustadt, P.C.

(57) ABSTRACT

An electronic information browsing system that provides a book-like interface—a virtual book—for presenting electronic contents. Specifically, an electronic information browsing system that allows users to configure its behavior via data and program specification encapsulated in a dynamic file format. Configurable behavior includes but not limited to the kind of contents to be displayed in the virtual book, the sources of the contents to be displayed, the static aspects of the virtual book such as the book dimensions and the dynamic aspects of the virtual book such as when a page is to be flipped, how the flipping of pages is contingent upon the execution of certain pre-specified events, etc.

23 Claims, 15 Drawing Sheets

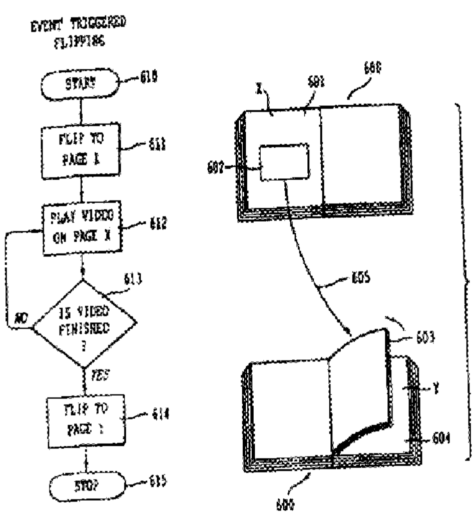

E-MAIL PASTING

SEARCH BOOK CREATION